(12) United States Patent
Gao et al.

(10) Patent No.: US 12,124,010 B2
(45) Date of Patent: Oct. 22, 2024

(54) OPTICAL IMAGING LENS ASSEMBLY

(71) Applicant: ZHEJIANG SUNNY OPTICS CO.,LTD., Zhejiang (CN)

(72) Inventors: Yang Gao, Zhejiang (CN); Xiangxi Wu, Zhejiang (CN); Wuchao Xu, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 619 days.

(21) Appl. No.: 17/383,461

(22) Filed: Jul. 23, 2021

(65) Prior Publication Data

US 2022/0026684 A1    Jan. 27, 2022

(30) Foreign Application Priority Data

Jul. 24, 2020   (CN) .......................... 202010728322.3

(51) Int. Cl.
*G02B 9/62*        (2006.01)
*G02B 13/00*       (2006.01)
(52) U.S. Cl.
CPC ........... *G02B 13/0045* (2013.01); *G02B 9/62* (2013.01)
(58) Field of Classification Search
USPC ........................................................ 359/756
See application file for complete search history.

(56) References Cited

U.S. PATENT DOCUMENTS

| | | | | |
|---|---|---|---|---|
| 10,795,124 B2* | 10/2020 | Oinuma | ............. | G02B 13/0045 |
| 2018/0188505 A1* | 7/2018 | Chang | ................. | G02B 13/0045 |
| 2020/0400924 A1* | 12/2020 | Xu | .......................... | G02B 13/06 |
| 2021/0011260 A1* | 1/2021 | Dai | .......................... | G02B 9/62 |

FOREIGN PATENT DOCUMENTS

CN           109541783 A   *   3/2019   ......... G02B 13/0045

* cited by examiner

*Primary Examiner* — Marin Pichler
*Assistant Examiner* — Mackenzi Waddell
(74) *Attorney, Agent, or Firm* — Samson G. Yu

(57) ABSTRACT

The disclosure provides an optical imaging lens assembly, which sequentially includes from an object side to an image side along an optical axis: a first lens with a refractive power; a second lens with a refractive power; a third lens with a refractive power; a fourth lens with a refractive power; a fifth lens with a refractive power; and a sixth lens with a refractive power. Wherein Semi-FOV is a half of a maximum field of view of the optical imaging lens assembly, and Semi-FOV satisfies Semi-FOV≥60°; A curvature radius of an object-side surface of the first lens and a curvature radius of an image-side surface of the first lens satisfy −2.5<(R1−R2)/(R1+R2)<−1.0; A curvature radius of an object-side surface of the second lens and a curvature radius of an image-side surface of the second lens satisfy 1.5<R4/R3<2.5.

18 Claims, 18 Drawing Sheets longitudinal aberration curve (millimeter)

longitudinal aberration curve (millimeter)

astigmatism curve (millimeter)

longitudinal aberration curve (millimeter)

longitudinal aberration curve

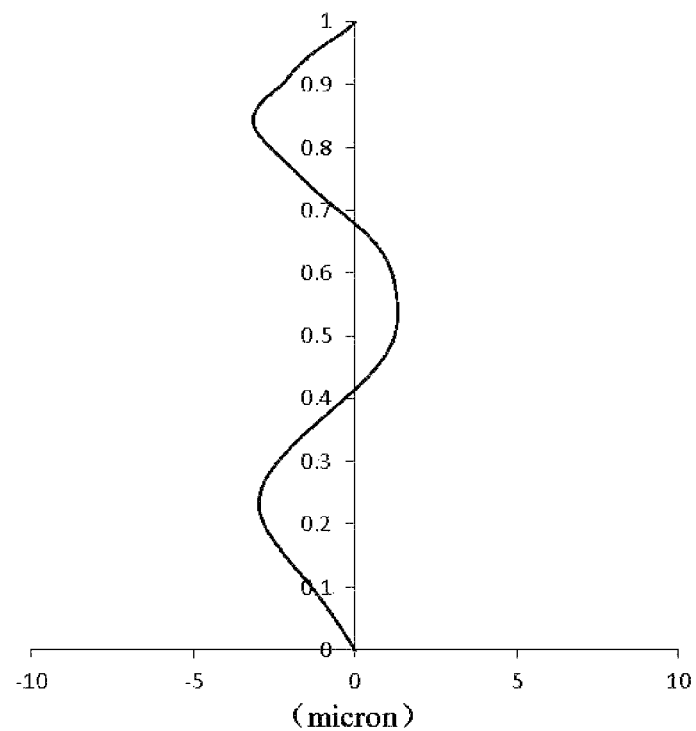

OPTICAL IMAGING LENS ASSEMBLY

CROSS-REFERENCE TO RELATED PRESENT INVENTION(S)

The disclosure claims priority to and the benefit of Chinese Patent Present invention No. 202010728322.3, filed in the China National Intellectual Property Administration (CNIPA) on 24 Jul. 2020, which is incorporated herein by reference in its entirety.

TECHNICAL FIELD

The disclosure relates to the field of optical elements, and particularly to an optical imaging lens assembly including six lenses.

BACKGROUND

In recent years, with the gradual popularization of intelligent terminals, requirements of people on the photographing performance of mobile phones have increased. Nowadays, rear camera modules of mainstream flagship phones of each major mobile phone brand are usually configured with optical imaging lens assemblies with ultra-wide angle to satisfy wide field of view shooting requirements of users.

However, since an optical imaging lens assembly with ultra-wide angle is relatively serious in distortion, a shot image may be obviously deformed, resulting in scale inharmony of the image, and such a distortion is required to be corrected by means of related post-processing software.

Therefore, there is an increasing market demand in optical imaging lens assemblies with ultra-wide angle and low distortions.

SUMMARY

The disclosure provides an optical imaging lens assembly, for example, an optical imaging lens assembly with an ultra-wide angle and an ultra-low distortion, applied to a portable electronic product and capable of at least overcoming or partially overcoming at least one shortcoming in the related art.

Some embodiments of the disclosure provide an optical imaging lens assembly, which may sequentially include from an object side to an image side along an optical axis: a first lens with a refractive power, a second lens with a refractive power, a third lens with a refractive power, a fourth lens with a refractive power, a fifth lens with a refractive power, and a sixth lens with a refractive power, wherein Semi-FOV is a half of a maximum field of view of the optical imaging lens assembly, and Semi-FOV may satisfy Semi-FOV≥60°; a curvature radius R1 of an object-side surface of the first lens and a curvature radius R2 of an image-side surface of the first lens may satisfy $-2.5<(R1-R2)/(R1+R2)<-1.0$; and a curvature radius R3 of an object-side surface of the second lens and a curvature radius R4 of an image-side surface of the second lens may satisfy $1.5<R4/R3<2.5$.

In an implementation mode, an effective focal length f1 of the first lens and an effective focal length f2 of the second lens may satisfy $-2.5<f2/f1<-1.5$.

In an implementation mode, an effective focal length f3 of the third lens and an effective focal length f4 of the fourth lens may satisfy $-2.5<f4/f3<-1.5$.

In an implementation mode, a distance TTL from the object-side surface of the first lens to an imaging surface on the optical axis and an effective focal length f6 of the sixth lens may satisfy $-3.5<TTL/f6<-2.5$.

In an implementation mode, a curvature radius R5 of an object-side surface of the third lens and a curvature radius R6 of an image-side surface of the third lens may satisfy $-2.5<R5/R6<-1.5$.

In an implementation mode, a center thickness CT1 of the first lens on the optical axis and an air space T12 between the first lens and the second lens on the optical axis may satisfy $1.0<T12/CT1<1.5$.

In an implementation mode, a center thickness CT3 of the third lens on the optical axis and an air space T34 between the third lens and the fourth lens on the optical axis may satisfy $2.0<CT3/T34<3.5$.

In an implementation mode, a center thickness CT4 of the fourth lens on the optical axis and an air space T45 between the fourth lens and the fifth lens on the optical axis may satisfy $1.5<CT4/T45<3.0$.

In an implementation mode, an abbe number V2 of the second lens and a curvature radius R4 of the image-side surface of the second lens may satisfy $4.0\ \text{mm}^{-1}<V2/R4<6.5\ \text{mm}^{-1}$.

In an implementation mode, a refractive index N2 of the second lens and a center thickness CT2 of the second lens on the optical axis may satisfy $3.0\ \text{mm}^{-1}<N2/CT2<5.5\ \text{mm}^{-1}$.

In an implementation mode, a curvature radius R7 of an object-side surface of the fourth lens and an abbe number V4 of the fourth lens may satisfy $0<R7/V4<1.0\ \text{mm}$.

In an implementation mode, a curvature radius R10 of an image-side surface of the fifth lens and a refractive index N5 of the fifth lens may satisfy $-2.5\ \text{mm}^{-1}<N5/R10<-1.5\ \text{mm}^{-1}$.

In an implementation mode, a curvature radius R11 of an object-side surface of the sixth lens and a refractive index N6 of the sixth lens may satisfy $1.0\ \text{mm}<R11/N6<1.5\ \text{mm}$.

Some other embodiments of the disclosure also provide an optical imaging lens assembly, which may sequentially include from an object side to an image side along an optical axis: a first lens with a refractive power, a second lens with a refractive power, a third lens with a refractive power, a fourth lens with a refractive power, a fifth lens with a refractive power, and a sixth lens with a refractive power, wherein Semi-FOV is a half of a maximum field of view of the optical imaging lens assembly, and Semi-FOV may satisfy Semi-FOV≥60°; a curvature radius R1 of an object-side surface of the first lens and a curvature radius R2 of an image-side surface of the first lens may satisfy $-2.5<(R1-R2)/(R1+R2)<-1.0$; and a center thickness CT3 of the third lens on the optical axis and an air space T34 of the third lens and the fourth lens on the optical axis may satisfy $2.0<CT3/T34<3.5$.

In an implementation mode, an effective focal length f1 of the first lens and an effective focal length f2 of the second lens may satisfy $-2.5<f2/f1<-1.5$.

In an implementation mode, an effective focal length f3 of the third lens and an effective focal length f4 of the fourth lens may satisfy $-2.5<f4/f3<-1.5$.

In an implementation mode, a distance TTL from the object-side surface of the first lens to an imaging surface on the optical axis and an effective focal length f6 of the sixth lens may satisfy $-3.5<TTL/f6<-2.5$.

In an implementation mode, a curvature radius R5 of an object-side surface of the third lens and a curvature radius R6 of an image-side surface of the third lens may satisfy $-2.5<R5/R6<-1.5$.

In an implementation mode, a center thickness CT1 of the first lens on the optical axis and an air space T12 between the first lens and the second lens on the optical axis may satisfy 1.0<T12/CT1<1.5.

In an implementation mode, a curvature radius R3 of an object-side surface of the second lens and a curvature radius R4 of an image-side surface of the second lens may satisfy 1.5<R4/R3<2.5.

In an implementation mode, a center thickness CT4 of the fourth lens on the optical axis and an air space T45 between the fourth lens and the fifth lens on the optical axis may satisfy 1.5<CT4/T45<3.0.

In an implementation mode, an abbe number V2 of the second lens and the curvature radius R4 of the image-side surface of the second lens may satisfy 4.0 mm$^{-1}$<V2/R4<6.5 mm$^{-1}$.

In an implementation mode, a refractive index N2 of the second lens and a center thickness CT2 of the second lens on the optical axis may satisfy 3.0 mm$^{-1}$<N2/CT2<5.5 mm$^{-1}$.

In an implementation mode, a curvature radius R7 of an object-side surface of the fourth lens and an abbe number V4 of the fourth lens may satisfy 0<R7/V4<1.0 mm.

In an implementation mode, a curvature radius R10 of an image-side surface of the fifth lens and a refractive index N5 of the fifth lens may satisfy −2.5 mm$^{-1}$<N5/R10<−1.5 mm$^{-1}$.

In an implementation mode, a curvature radius R11 of an object-side surface of the sixth lens and a refractive index N6 of the sixth lens may satisfy 1.0 mm<R11/N6<1.5 mm.

According to the optical imaging lens assembly provided in the disclosure, multiple lenses are adopted, for example, the first lens to the sixth lens. The curvature radii, center thicknesses, abbe numbers and refractive indexes of each lens in the optical imaging lens assembly may be reasonably controlled to achieve the characteristics of ultra-wide angle, ultra-low distortion, high imaging quality, etc., of the optical imaging lens assembly. In addition, each lens is compact in structure and high in formability and machinability, and the yield of a camera module may be improved.

BRIEF DESCRIPTION OF THE DRAWINGS

Detailed descriptions are made to unrestrictive embodiments below in combination with the drawings to make the other characteristics, purposes and advantages of the disclosure more apparent. In the drawings:

FIGS. 14A-14D show a longitudinal aberration curve, an astigmatism curve, a distortion curve and a lateral color curve of an optical imaging lens assembly according to Embodiment 7 respectively.

DETAILED DESCRIPTION OF THE EMBODIMENTS

Figure 1:
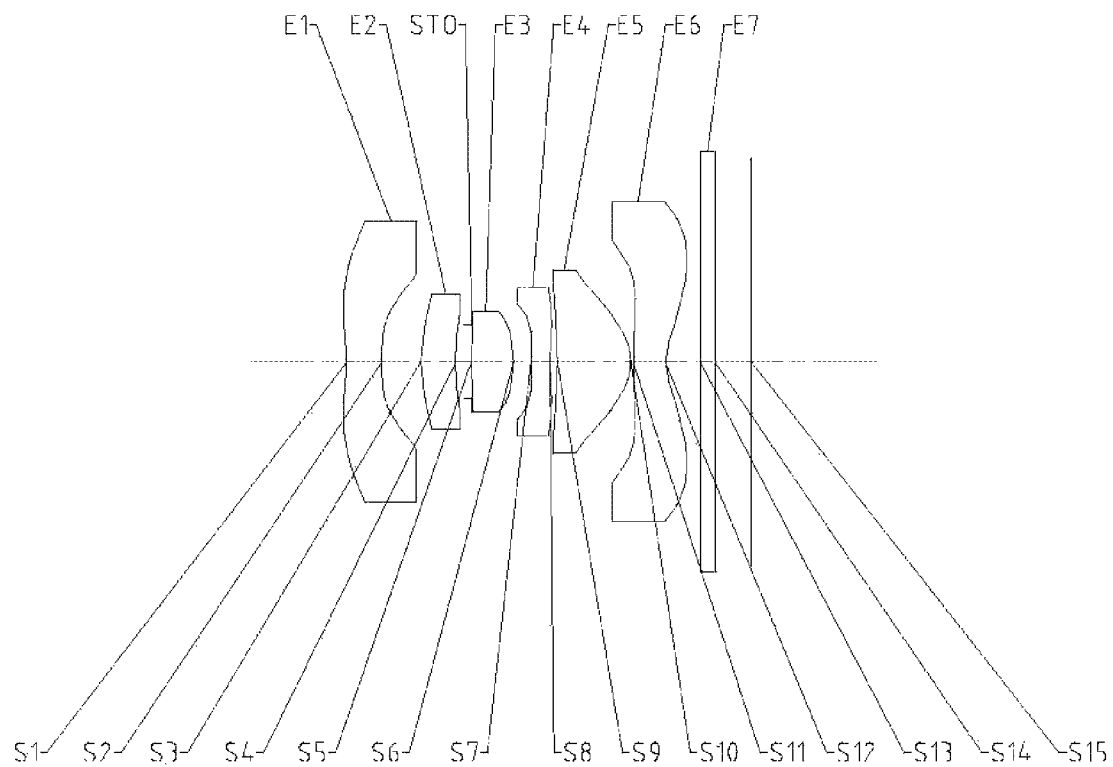
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc., are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to the exemplary embodiment of the disclosure may include six lenses with refractive power, i.e., a first lens, a second lens, a third lens, a fourth lens, a fifth lens and a sixth lens. The six lenses are sequentially arranged from an object side to an image side along an optical axis. In the first lens to the sixth lens, there may be an air space between every two adjacent lenses.

In the exemplary embodiment, the first lens has a positive refractive power or a negative refractive power; the second lens has a positive refractive power or a negative refractive power; the third lens has a positive refractive power or a negative refractive power; the fourth lens has a positive refractive power or a negative refractive power; the fifth lens has a positive refractive power or a negative refractive power; and the sixth lens has a positive refractive power or a negative refractive power. The refractive power and surface types of each lens in the optical system may be reasonably matched to ensure the structural reasonability of the optical imaging lens assembly.

In the exemplary embodiment, an object-side surface of the first lens may be a concave surface, and an image-side surface thereof may be a concave surface.

In the exemplary embodiment, an object-side surface of the second lens may be a convex surface, and an image-side surface thereof may be a concave surface.

In the exemplary embodiment, an object-side surface of the third lens may be a convex surface, and an image-side surface thereof may be a convex surface.

In the exemplary embodiment, an object-side surface of the fourth lens may be a convex surface, and an image-side surface thereof may be a concave surface.

In the exemplary embodiment, an image-side surface of the fifth lens may be a convex surface.

In the exemplary embodiment, an object-side surface of the sixth lens may be a convex surface, and an image-side surface thereof may be a concave surface.

In the exemplary embodiment, Semi-FOV is a half of a maximum field of view of the optical imaging lens assembly, and Semi-FOV may satisfy Semi-FOV≥60°, more specifically, 60°≤Semi-FOV<65°. The half of the maximum field of view of the optical imaging lens assembly may be reasonably controlled to endow the optical imaging lens assembly with an ultra-wide field of view.

In the exemplary embodiment, a curvature radius R1 of the object-side surface of the first lens and a curvature radius R2 of the image-side surface of the first lens may satisfy −2.5<(R1−R2)/(R1+R2)<−1.0, more specifically, −2.5<(R1−R2)/(R1+R2)<−1.4. A ratio of the curvature radii of the object-side surface and the image-side surface of the first lens may be controlled in a reasonable numerical range to effectively control contributions of the object-side surface and the image-side surface of the first lens to astigmatism of the optical imaging system to further effectively and reasonably control the imaging quality of the optical imaging system in a middle field of view and an aperture band.

In the exemplary embodiment, a curvature radius R3 of the object-side surface of the second lens and a curvature radius R4 of the image-side surface of the second lens may satisfy 1.5<R4/R3<2.5, more specifically, 1.7<R4/R3<2.4. A ratio of the curvature radii of the object-side surface and the image-side surface of the second lens may be controlled in a reasonable numerical range to ensure that total deflection angles of the object-side surface and the image-side surface of the second lens in a marginal field of view of the optical imaging lens assembly in a reasonable angle range, thereby effectively reducing the sensitivity of the optical imaging system.

In the exemplary embodiment, an effective focal length f1 of the first lens and an effective focal length f2 of the second lens may satisfy −2.5<f2/f1<−1.5, more specifically, −2.5<f2/f1<−1.9. A ratio of the effective focal lengths of the first lens and the second lens is controlled in a reasonable numerical range to help to implement reasonable spatial configuration of the refractive power of the first lens and the second lens in the optical imaging lens assembly to reduce an aberration of the optical imaging lens assembly.

In the exemplary embodiment, an effective focal length f3 of the third lens and an effective focal length f4 of the fourth lens may satisfy −2.5<f4/f3<−1.5. A ratio of the effective focal lengths of the third lens and the fourth lens is controlled in a reasonable numerical range to help to implement reasonable spatial configuration of the refractive power of the third lens and the fourth lens in the optical imaging lens assembly to reduce the aberration of the optical imaging lens assembly.

In the exemplary embodiment, a distance TTL from the object-side surface of the first lens to an imaging surface on the optical axis and an effective focal length f6 of the sixth lens may satisfy −3.5<TTL/f6<−2.5, more specifically, −3.1<TTL/f6<−2.7. A ratio of the total track length of the optical imaging lens assembly to the effective focal length of the sixth lens may be controlled in a reasonable numerical range to ensure that a third-order positive spherical aberration and a fifth-order negative spherical aberration of the optical imaging lens assembly are in a reasonable numerical range and balance left spherical aberrations generated by the first lens to the fifth lens in the optical imaging system, thereby improving the imaging quality of the optical imaging lens assembly in an on-axis field of view.

In the exemplary embodiment, a curvature radius R5 of the object-side surface of the third lens and a curvature radius R6 of the image-side surface of the third lens may satisfy −2.5<R5/R6<−1.5. A ratio of the curvature radii of the object-side surface and the image-side surface of the third lens may be controlled in a reasonable numerical range to effectively control aberration contributions of the object-side surface and the image-side surface of the third lens in the optical imaging system to effectively balance an aperture band related aberration in the optical imaging system, thereby effectively improving the imaging quality of the optical imaging lens assembly.

In the exemplary embodiment, a center thickness CT1 of the first lens on the optical axis and an air space T12 between the first lens and the second lens on the optical axis may satisfy 1.0<T12/CT1<1.5, more specifically, 1.0<T12/CT1<1.2. A ratio of the center thickness of the first lens on the optical axis to the air space between the first lens and the second lens on the optical axis may be controlled in a reasonable numerical value to effectively ensure a field curvature and a distortion of the optical imaging system, thereby achieving high imaging quality of the optical imaging lens assembly in an off-axis field of view.

In the exemplary embodiment, a center thickness CT3 of the third lens on the optical axis and an air space T34 between the third lens and the fourth lens on the optical axis may satisfy 2.0<CT3/T34<3.5. A ratio of the center thickness of the third lens on the optical axis to the air space between the third lens and the fourth lens on the optical axis is controlled in a reasonable numerical range to help to machine and form the third lens.

In the exemplary embodiment, a center thickness CT4 of the fourth lens on the optical axis and an air space T45 between the fourth lens and the fifth lens on the optical axis may satisfy 1.5<CT4/T45<3.0, more specifically, 1.8<CT4/T45<3.0. A ratio of the center thickness of the fourth lens on the optical axis to the air space between the fourth lens and the fifth lens on the optical axis is controlled in a reasonable numerical range to help to machine and form the fourth lens.

In the exemplary embodiment, an abbe number V2 of the second lens and the curvature radius R4 of the image-side surface of the second lens may satisfy $4.0 \text{ mm}^{-1}<V2/R4<6.5 \text{ mm}^{-1}$. A ratio of the abbe number of the second lens to the curvature radius of the image-side surface thereof is controlled in a reasonable numerical value to help to correct an axial spherochromatic aberration of the optical imaging system to endow the optical imaging lens assembly with higher imaging quality.

In the exemplary embodiment, a refractive index N2 of the second lens and a center thickness CT2 of the second lens on the optical axis may satisfy $3.0 \text{ mm}^{-1}<N2/CT2<5.5 \text{ mm}^{-1}$. A ratio of the refractive index of the second lens to the center thickness thereof on the optical axis is controlled in a reasonable numerical value to help to correct a lateral spherochromatic aberration of the optical imaging system to endow the optical imaging lens assembly with higher imaging quality.

In the exemplary embodiment, a curvature radius R7 of the object-side surface of the fourth lens and an abbe number V4 of the fourth lens may satisfy 0<R7/V4<1.0 mm, more specifically, 0.2<R7/V4<0.8 mm. A ratio of the abbe number of the fourth lens to the curvature radius of the object-side surface thereof is controlled in a reasonable numerical value to help to correct the axial spherochromatic aberration of the optical imaging system to endow the optical imaging lens assembly with higher imaging quality.

In the exemplary embodiment, a curvature radius R10 of the image-side surface of the fifth lens and a refractive index N5 of the fifth lens may satisfy $-2.5 \text{ mm}^{-1}<N5/R10<-1.5 \text{ mm}^{-1}$. A ratio of the refractive index of the fifth lens to the curvature radius of the image-side surface thereof is controlled in a reasonable numerical value to help to correct the lateral spherochromatic aberration of the optical imaging system to endow the optical imaging lens assembly with higher imaging quality.

In the exemplary embodiment, a curvature radius R11 of the object-side surface of the sixth lens and a refractive index N6 of the sixth lens may satisfy 1.0 mm<R11/N6<1.5 mm, more specifically, 1.3 mm<R11/N6<1.5 mm. A ratio of the refractive index of the sixth lens to the curvature radius of the object-side surface thereof is controlled in a reasonable numerical value to help to correct the lateral spherochromatic aberration of the optical imaging system to endow the optical imaging lens assembly with higher imaging quality.

In the exemplary embodiment, the optical imaging lens assembly may further include a diaphragm. The diaphragm may be arranged at a proper position as required. For example, the diaphragm may be arranged between the second lens and the third lens. Optionally, the optical imaging lens assembly may further include an optical filter configured to correct the chromatic aberration and/or protective glass configured to protect a photosensitive element on the imaging surface.

The disclosure provides an optical imaging lens assembly with the characteristics of ultra-large image surface, ultra-wide angle, etc. The optical imaging lens assembly according to the embodiment of the disclosure may adopt multiple lenses, for example, the abovementioned six. The refractive power and surface types of each lens, the center thickness of each lens, on-axis distances between the lenses, etc., may be reasonably configured to effectively converge incident light, reduce the optical total length of the imaging lens, improve the manufacturability of the imaging lens and ensure that the optical imaging lens assembly is more favorable for production and manufacturing.

In the exemplary embodiment, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatism aberrations. With adoption of the aspheric lens, aberrations during imaging may be eliminated as much as possible, thereby improving the imaging quality. Optionally, at least one of the object-side surface and the image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens assembly.

However, those skilled in the art should know that the number of the lenses forming the optical imaging lens assembly may be changed without departing from the technical solutions claimed in the disclosure to achieve each result and advantage described in the specification. For example, although descriptions are made in the embodiment with six lenses as an example, the optical imaging lens assembly is not limited to six lenses. If necessary, the optical imaging lens assembly may further include another number of lenses.

Specific embodiments applied to the optical imaging lens assembly of the abovementioned embodiment will further be described below with reference to the drawings.

Embodiment 1

An optical imaging lens assembly according to Embodiment 1 of the disclosure will be described below with reference to FIGS. 1-2D. FIG. 1 shows a structural schematic diagram of an optical imaging lens assembly according to Embodiment 1 of the disclosure.

As shown in FIG. 1, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

Table 1 shows a basic parameter table of the optical imaging lens assembly of Embodiment 1, wherein the units of the curvature radius, the thickness/distance and the focal length are all millimeters (mm).

TABLE 1

| Surface number | Surface type | Curvature radius | Thickness/ distance | Material Refractive Index N | Abbe number V | Focal length | Conic coefficient |
|---|---|---|---|---|---|---|---|
| OBJ | Spherical | Infinite | Infinite | | | | |
| S1 | Aspheric | −2.3087 | 0.5042 | 1.55 | 56.1 | −3.21 | 0.0027 |
| S2 | Aspheric | 7.7983 | 0.5681 | | | | 0.0372 |
| S3 | Aspheric | 2.4229 | 0.4996 | 1.62 | 25.9 | 6.52 | −2.3789 |
| S4 | Aspheric | 5.5810 | 0.2386 | | | | −57.4463 |
| STO | Spherical | Infinite | −0.0149 | | | | |
| S5 | Aspheric | 4.4516 | 0.6129 | 1.55 | 56.1 | 2.66 | −15.9239 |
| S6 | Aspheric | −2.0559 | 0.2543 | | | | 0.1422 |
| S7 | Aspheric | 7.6579 | 0.2700 | 1.68 | 19.2 | −5.37 | −11.7200 |
| S8 | Aspheric | 2.4320 | 0.1095 | | | | −0.7881 |
| S9 | Aspheric | −16.5892 | 1.0609 | 1.54 | 55.6 | 1.39 | −8.6017 |
| S10 | Aspheric | −0.7323 | 0.0328 | | | | −1.0738 |
| S11 | Aspheric | 2.3032 | 0.4668 | 1.65 | 23.5 | −1.92 | 0.1202 |
| S12 | Aspheric | 0.7403 | 0.5067 | | | | −0.9944 |
| S13 | Spherical | Infinite | 0.2100 | 1.52 | 64.2 | | |
| S14 | Spherical | Infinite | 0.5171 | | | | |
| S15 | Spherical | Infinite | | | | | |

In the embodiment, a total effective focal length f of the optical imaging lens assembly is 1.77 mm, a distance TTL from the object-side surface S1 of the first lens E1 to the imaging surface S15 on the optical axis is 5.84 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 60.2°, and an F-number (Fno) of the optical imaging lens assembly is 2.23.

In Embodiment 1, both the object-side surface and the image-side surface of any lens in the first lens E1 to the sixth lens E6 are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a vector height of a distance between the aspheric surface and a vertex of the aspheric surface when the aspheric surface is located at a position with the height h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 and Table 3 show higher-order coefficients A4, A6, A8, A10, A12, A14, A16, A18, A20, A22, A24, A26, A28, and A30 that can be used for each of the aspheric mirror surfaces S1-S16 in Embodiment 1.

TABLE 2

| Surface number | A4 | A6 | A8 | A10 | A12 | A14 | A16 |
|---|---|---|---|---|---|---|---|
| S1 | 4.1983E−01 | −5.8465E−01 | 8.4773E−01 | −1.0397E+00 | 9.9663E−01 | −7.2705E−01 | 4.0066E−01 |
| S2 | 5.0450E−01 | −6.0052E−01 | −1.2028E−01 | 7.2679E+00 | −3.4008E+01 | 8.9564E+01 | −1.5423E+02 |
| S3 | 5.2007E−02 | −3.1763E−01 | 1.3764E+00 | −5.3223E+00 | 1.3539E+01 | −2.1951E+01 | 2.1807E+01 |
| S4 | 9.7021E−02 | −1.4944E−01 | 1.1242E+00 | −8.4846E+00 | 4.7124E+01 | −1.6324E+02 | 3.4044E+02 |
| S5 | −3.0548E−03 | 8.0915E−01 | −1.7618E+01 | 2.0815E+02 | −1.5364E+03 | 7.0055E+03 | −1.9152E+04 |
| S6 | −2.3187E−01 | −3.6134E−01 | 6.1349E+00 | −5.0542E+01 | 2.3697E+02 | −6.7942E+02 | 1.1667E+03 |
| S7 | −6.4463E−01 | 1.5613E−01 | 1.2257E+01 | −1.2492E+02 | 6.2514E+02 | −1.6749E+03 | 3.5155E+03 |
| S8 | −5.5292E−01 | −3.7755E−01 | 1.2035E−01 | −6.3803E+01 | 1.8864E+02 | −3.5630E+02 | 4.4628E+02 |
| S9 | −1.4329E−01 | −7.1283E−01 | 7.4316E−01 | 3.9927E+01 | −2.6910E+02 | 9.0835E+02 | −1.9464E+03 |
| S10 | 3.3932E−01 | −1.3810E+00 | 5.1279E+00 | −1.3356E+01 | 2.4820E+01 | −3.2917E+01 | 3.0889E+01 |
| S11 | −3.6850E−01 | −8.5808E−01 | 6.1920E+00 | 1.7241E+01 | 2.9959E−01 | −3.6027E+01 | 3.1140E+01 |
| S12 | −1.2737E+00 | 2.3101E+00 | −3.3152E+00 | 3.5771E+00 | −2.8816E+00 | 1.7315E+00 | −7.7654E−01 |

TABLE 3

| Surface number | A18 | A20 | A822 | A24 | A26 | A28 | A30 |
|---|---|---|---|---|---|---|---|
| S1 | −1.6605E−01 | 5.1329E−02 | −1.1636E−02 | 1.8758E−03 | −2.0335E−04 | 1.3274E−05 | −3.9387E−07 |
| S2 | 1.8149E+02 | −1.4738E+02 | 8.1464E+01 | −2.9415E+01 | 6.3428E+00 | −6.5912E−01 | 1.3460E−02 |
| S3 | −1.2010E+01 | 2.7900E+00 | 0.0000E+00 | 0.0000E+00 | 0.0000E+00 | 0.0000E+00 | 0.0000E+00 |
| S4 | −3.8772E+02 | 1.8406E+02 | 0.0000E+00 | 0.0000E+00 | 0.0000E+00 | 0.0000E+00 | 0.0000E+00 |
| S5 | 2.8606E+04 | −1.7846E+04 | 0.0000E+00 | 0.0000E+00 | 0.0000E+00 | 0.0000E+00 | 0.0000E+00 |
| S6 | −1.1058E+03 | 4.4525E+02 | 0.0000E+00 | 0.0000E+00 | 0.0000E+00 | 0.0000E+00 | 0.0000E+00 |
| S7 | −4.0391E+03 | 2.5970E+03 | −7.1365E+02 | 0.0000E+00 | 0.0000E+00 | 0.0000E+00 | 0.0000E+00 |
| S8 | −3.6947E+02 | 1.9437E+02 | −5.8837E+01 | 7.7983E+00 | 0.0000E+00 | 0.0000E+00 | 0.0000E+00 |
| S9 | 2.8650E+03 | −2.9698E+03 | 2.1758E+03 | −1.1055E+03 | 3.7130E+02 | −7.4241E+01 | 6.6992E+00 |
| S10 | −2.0197E+01 | 8.9462E+00 | −2.5495E+00 | 4.2176E−01 | −3.0965E−02 | 0.0000E+00 | 0.0000E+00 |
| S11 | −1.9631E+01 | 9.0375E+00 | −3.0050E+00 | 7.0257E−01 | −1.0955E−01 | 1.0225E−02 | −4.3202E−04 |
| S12 | 2.5953E−01 | −6.4205E−02 | 1.1576E−02 | −1.4769E−03 | 1.2624E−04 | −6.4824E−06 | 1.5112E−07 |

Figure 2A:
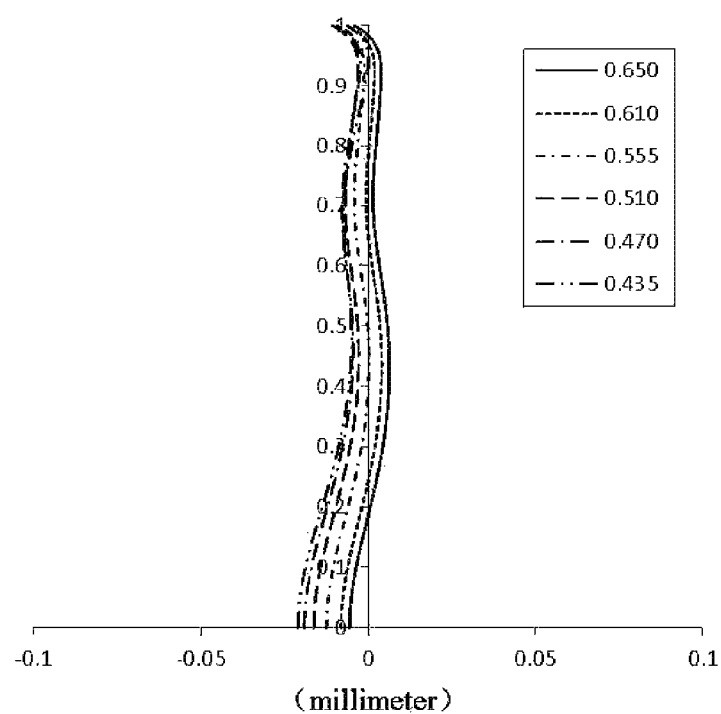
FIGS. 2A-2D show a longitudinal aberration curve, an astigmatism curve, a distortion curve and a lateral color curve of an optical imaging lens assembly according to Embodiment 1 respectively.
Figure 2B:
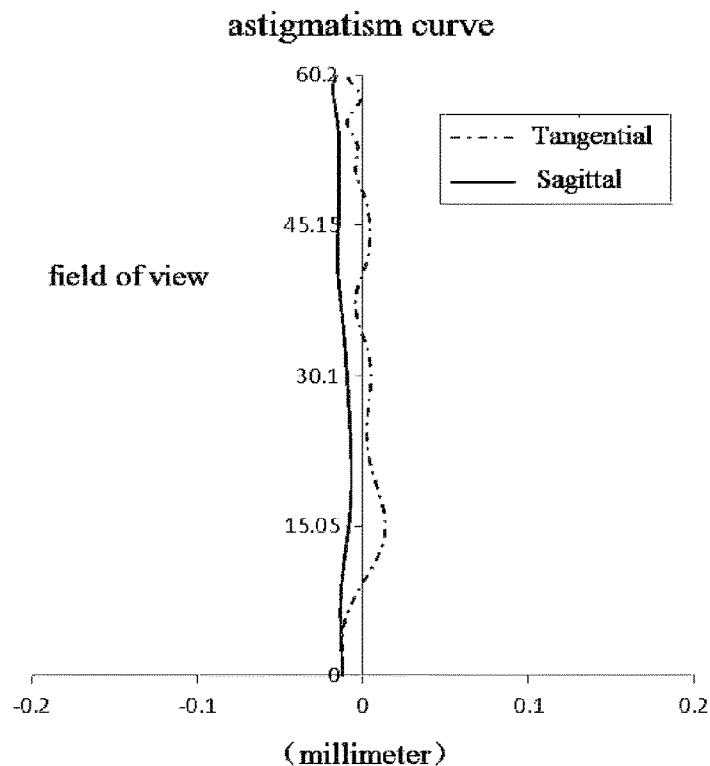
Figure 2C:
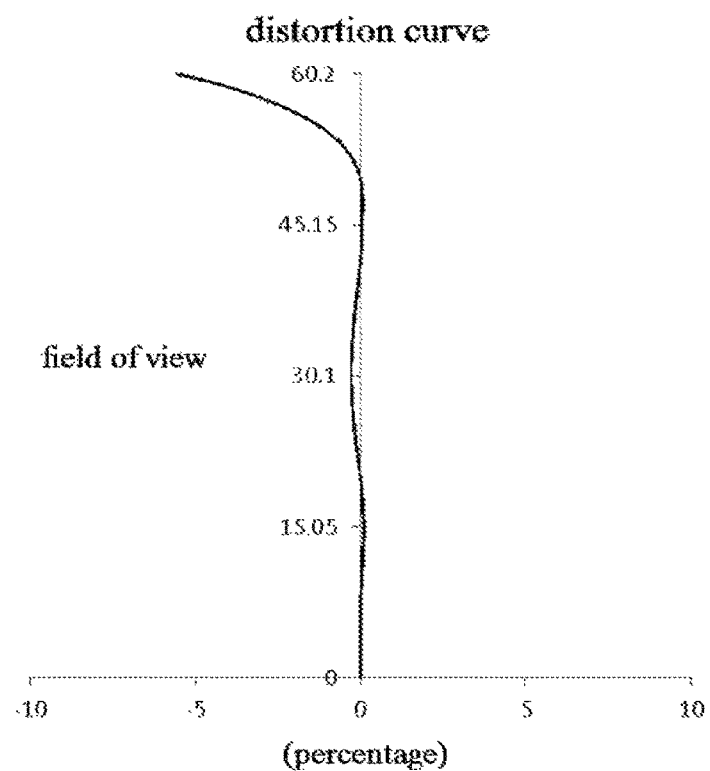
Figure 2D:
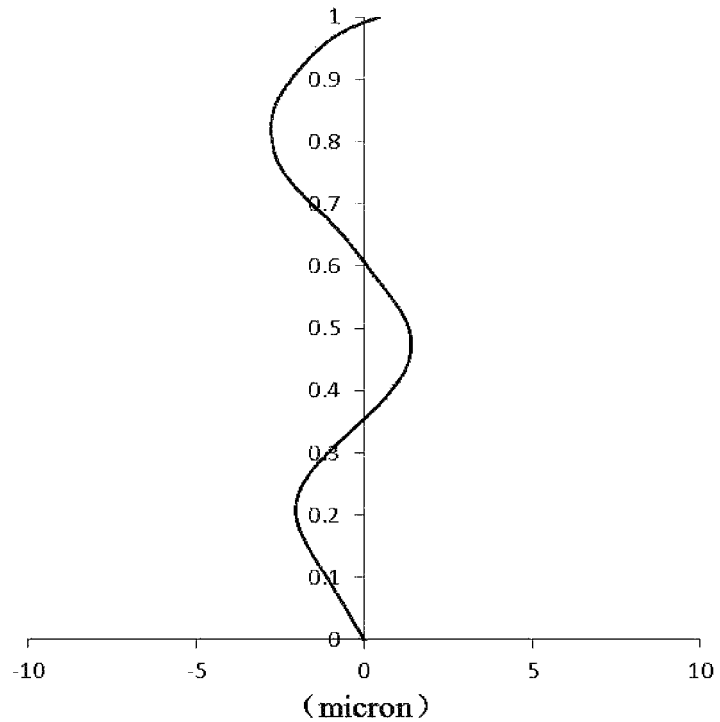

FIG. 2A shows a longitudinal aberration curve of the optical imaging lens assembly according to Embodiment 1 to represent deviation of a convergence focal point after light with different wavelengths passes through the lens. FIG. 2B shows an astigmatism curve of the optical imaging lens assembly according to Embodiment 1 to represent a curvature of tangential image surface and a curvature of sagittal image surface. FIG. 2C shows a distortion curve of the optical imaging lens assembly according to Embodiment 1 to represent distortion values corresponding to different fields of view. FIG. 2D shows a lateral color curve of the optical imaging lens assembly according to Embodiment 1 to represent deviation of different image heights on the imaging surface after the light passes through the lens. According to FIGS. 2A-2D, it can be seen that the optical imaging lens assembly provided in Embodiment 1 may achieve high imaging quality.

Embodiment 2

Figure 3:
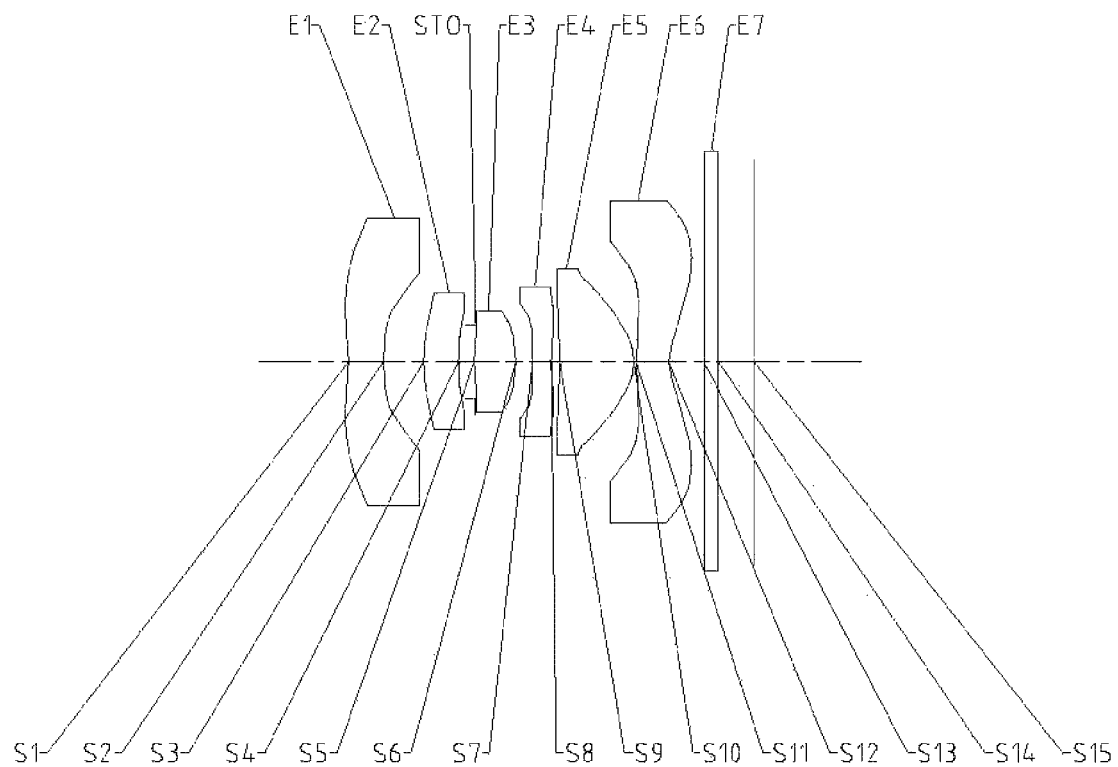
FIG. 3 shows a structural schematic diagram of an optical imaging lens assembly according to Embodiment 2 of the disclosure.

An optical imaging lens assembly according to Embodiment 2 of the disclosure will be described below with reference to FIGS. 3-4D. FIG. 3 shows a structural schematic diagram of an optical imaging lens assembly according to Embodiment 2 of the disclosure.

As shown in FIG. 3, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.79 mm, a distance TTL from the object-side surface S1 of the first lens E1 to the imaging surface S15 on the optical axis is 5.84 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 62.0°, and an Fno of the optical imaging lens assembly is 2.23.

Table 4 shows a basic parameter table of the optical imaging lens assembly of Embodiment 2, wherein the units of the curvature radius, the thickness/distance and the focal length are all millimeters (mm).

TABLE 4

| Surface number | Surface type | Curvature radius | Thickness/ distance | Material Refractive Index N | Abbe number V | Focal length | Conic coefficient |
|---|---|---|---|---|---|---|---|
| OBJ | Spherical | Infinite | Infinite | | | | |
| S1 | Aspheric | −2.3098 | 0.5063 | 1.55 | 56.1 | −3.19 | 0.0031 |
| S2 | Aspheric | 7.6057 | 0.5727 | | | | 0.0880 |
| S3 | Aspheric | 2.3241 | 0.5024 | 1.62 | 25.9 | 7.59 | −2.7657 |
| S4 | Aspheric | 4.2163 | 0.2498 | | | | −38.9727 |
| STO | Spherical | Infinite | −0.0213 | | | | |
| S5 | Aspheric | 3.7230 | 0.5982 | 1.55 | 56.1 | 2.59 | −9.4301 |
| S6 | Aspheric | −2.1457 | 0.2414 | | | | 0.0499 |
| S7 | Aspheric | 6.9730 | 0.2700 | 1.68 | 19.2 | −5.74 | 8.3493 |
| S8 | Aspheric | 2.4569 | 0.1207 | | | | −0.4910 |
| S9 | Aspheric | −37.7661 | 1.0640 | 1.54 | 55.6 | 1.42 | 16.7505 |
| S10 | Aspheric | −0.7569 | 0.0328 | | | | −1.0574 |
| S11 | Aspheric | 2.2350 | 0.4685 | 1.65 | 23.5 | −1.91 | 0.0766 |
| S12 | Aspheric | 0.7285 | 0.5078 | | | | −0.9986 |
| S13 | Spherical | Infinite | 0.2100 | 1.52 | 64.2 | | |
| S14 | Spherical | Infinite | 0.5182 | | | | |
| S15 | Spherical | Infinite | | | | | |

In Embodiment 2, both the object-side surface and the image-side surface of any lens in the first lens E1 to the sixth lens E6 are aspheric surfaces. Table 5 and Table 6 show higher-order coefficients A4, A6, A8, A10, A12, A14, A16, A18, A20, A22, A24, A26, A28, and A30 that can be used for each of the aspheric mirror surfaces S1-S16 in Embodiment 2.

TABLE 5

| Surface number | A4 | A6 | A8 | A10 | A12 | A14 | A16 |
|---|---|---|---|---|---|---|---|
| S1 | 4.2012E−01 | −5.9871E−01 | 8.9175E−01 | −1.1187E+00 | 1.0886E+00 | −7.9836E−01 | 4.3736E−01 |
| S2 | 5.0733E−01 | −8.4296E−01 | 2.4166E+00 | −7.1145E+00 | 1.6562E+01 | −2.8593E+01 | 3.6485E+01 |
| S3 | 5.0895E−02 | −3.2962E−01 | 1.4126E+00 | −5.3923E+00 | 1.3655E+01 | −2.2096E+01 | 2.1878E+01 |
| S4 | 1.1253E−01 | −1.5878E−01 | 1.2968E+00 | −1.1310E+01 | 6.9524E+01 | −2.5738E+02 | 5.5887E+02 |
| S5 | 1.2990E−02 | 2.8342E−01 | −4.4378E+00 | 3.2156E+01 | −1.4797E+02 | 3.8825E+02 | −4.5557E+02 |
| S6 | −2.5775E−01 | 7.9012E−02 | 2.1853E+00 | −2.7219E+01 | 1.4578E+02 | −4.4794E+02 | 8.0080E+02 |
| S7 | −6.4077E−01 | 5.5685E−01 | 4.6277E+00 | −5.8730E+01 | 3.0799E+02 | −9.4449E+02 | 1.7906E+03 |
| S8 | −5.8016E−01 | 5.3909E−01 | 3.8258E+00 | −2.6460E+01 | 8.5620E+01 | −1.7009E+02 | 2.1966E+02 |
| S9 | −1.3798E−01 | −7.6897E−01 | 6.1037E+00 | −1.7518E+01 | 2.1272E+01 | 1.5031E+01 | −1.0288E+02 |
| S10 | 3.1211E−01 | −1.3073E+00 | 5.2122E+00 | −1.2856E+01 | 1.9429E+01 | −1.6897E+01 | 5.4433E+00 |
| S11 | −3.9750E−01 | −8.1861E−01 | 6.5768E+00 | −1.9516E+01 | 3.5846E+01 | −4.5395E+01 | 4.1251E+01 |
| S12 | −1.2594E+00 | 2.2734E+00 | −3.2554E+00 | 3.4955E+00 | −2.7952E+00 | 1.6650E+00 | −7.3960E−01 |

TABLE 6

| Surface number | A18 | A20 | A822 | A24 | A26 | A28 | A30 |
|---|---|---|---|---|---|---|---|
| S1 | −1.7807E−01 | 5.3428E−02 | −1.1620E−02 | 1.7771E−03 | −1.8079E−04 | 1.0959E−05 | −2.9876E−07 |
| S2 | −3.5322E+01 | 2.6989E+01 | −1.6708E+01 | 8.1700E+00 | −2.8801E+00 | 6.2671E−01 | −6.1594E−02 |
| S3 | −1.1968E+01 | 2.7464E+00 | 0.0000E+00 | 0.0000E+00 | 0.0000E+00 | 0.0000E+00 | 0.0000E+00 |
| S4 | −6.4979E+02 | 3.0977E+02 | 0.0000E+00 | 0.0000E+00 | 0.0000E+00 | 0.0000E+00 | 0.0000E+00 |
| S5 | −1.3618E+02 | 6.0799E+02 | 0.0000E+00 | 0.0000E+00 | 0.0000E+00 | 0.0000E+00 | 0.0000E+00 |
| S6 | −7.7681E+02 | 3.1569E+02 | 0.0000E+00 | 0.0000E+00 | 0.0000E+00 | 0.0000E+00 | 0.0000E+00 |
| S7 | −2.0646E+03 | 1.3244E+03 | −3.6118E+02 | 0.0000E+00 | 0.0000E+00 | 0.0000E+00 | 0.0000E+00 |
| S8 | −1.8509E+02 | 9.8253E+01 | −2.9842E+01 | 3.9551E+00 | 0.0000E+00 | 0.0000E+00 | 0.0000E+00 |
| S9 | 1.9004E+02 | −2.0435E+02 | 1.4213E+02 | −6.4711E+01 | 1.8560E+01 | −3.0150E+00 | 2.0755E−01 |
| S10 | 4.5717E+00 | −6.3315E+00 | 3.2930E+00 | −8.4470E−01 | 8.8128E−02 | 0.0000E+00 | 0.0000E+00 |
| S11 | −2.7325E+01 | 1.3215E+01 | −4.6142E+00 | 1.1321E+00 | −1.8501E−01 | 1.8072E−02 | −7.9769E−04 |
| S12 | 2.4459E−01 | −5.9791E−02 | 1.0635E−02 | −1.3359E−03 | 1.1219E−04 | −5.6472E−06 | 1.2873E−07 |

Figure 4A:
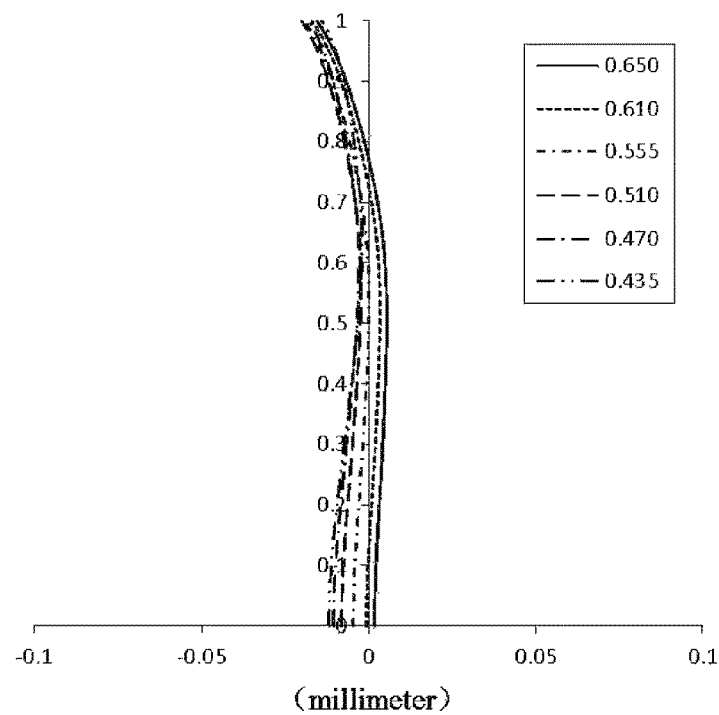
FIGS. 4A-4D show a longitudinal aberration curve, an astigmatism curve, a distortion curve and a lateral color curve of an optical imaging lens assembly according to Embodiment 2 respectively.
Figure 4B:
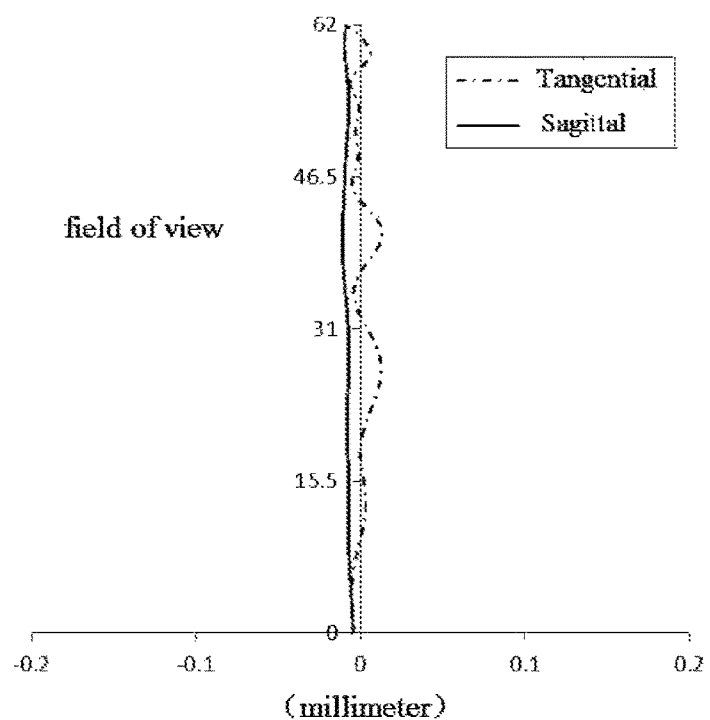
Figure 4C:
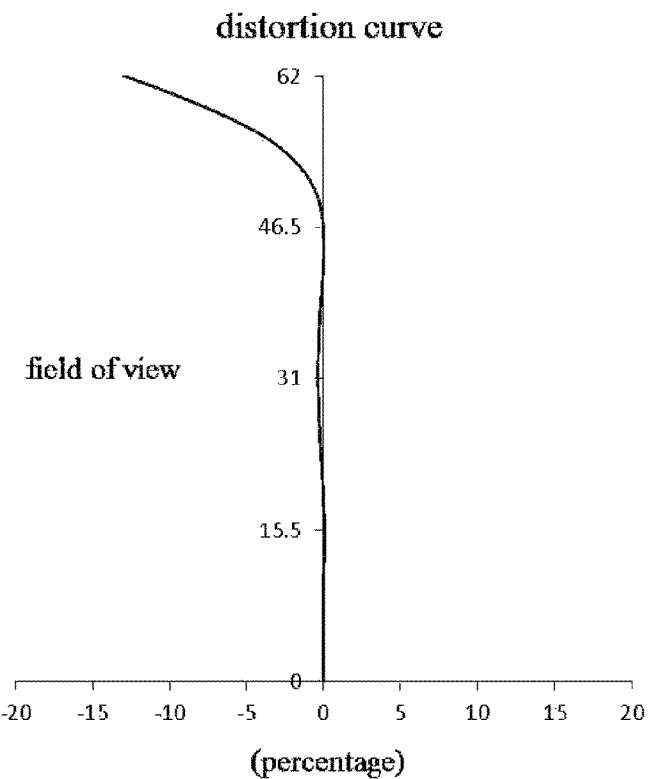
Figure 4D:
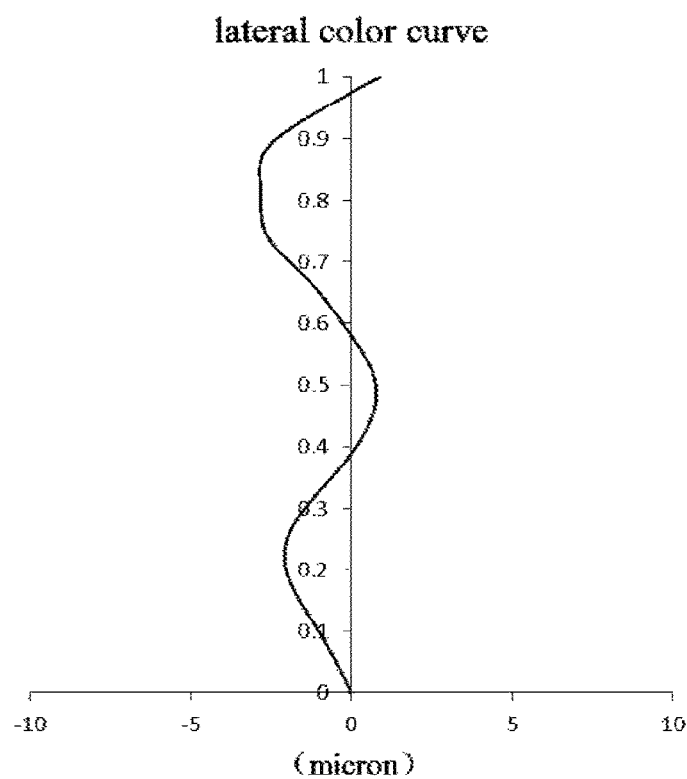

FIG. 4A shows a longitudinal aberration curve of the optical imaging lens assembly according to Embodiment 2 to represent deviation of a convergence focal point after light with different wavelengths passes through the lens. FIG. 4B shows an astigmatism curve of the optical imaging lens assembly according to Embodiment 2 to represent a curvature of tangential image surface and a curvature of sagittal image surface. FIG. 4C shows a distortion curve of the optical imaging lens assembly according to Embodiment 2 to represent distortion values corresponding to different fields of view. FIG. 4D shows a lateral color curve of the optical imaging lens assembly according to Embodiment 2 to represent deviation of different image heights on the imaging surface after the light passes through the lens. According to FIGS. 4A-4D, it can be seen that the optical imaging lens assembly provided in Embodiment 2 may achieve high imaging quality.

Embodiment 3

Figure 5:
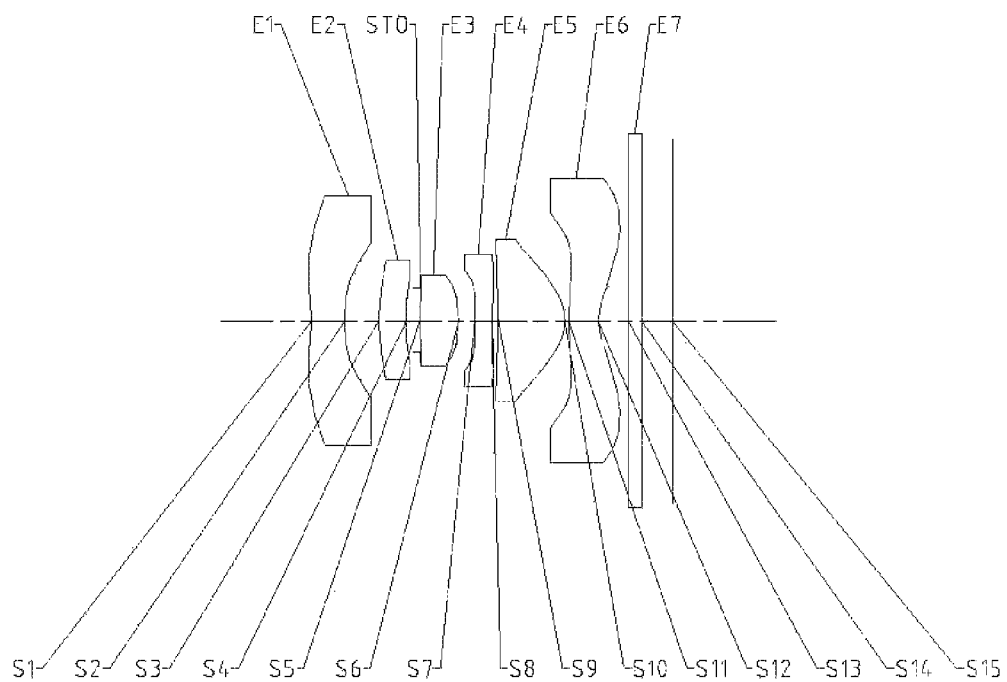
FIG. 5 shows a structural schematic diagram of an optical imaging lens assembly according to Embodiment 3 of the disclosure.

An optical imaging lens assembly according to Embodiment 3 of the disclosure will be described below with reference to FIGS. 5-6D. FIG. 5 shows a structural schematic diagram of an optical imaging lens assembly according to Embodiment 3 of the disclosure.

As shown in FIG. 5, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.75 mm, a distance TTL from the object-side surface S1 of the first lens E1 to the imaging surface S15 on the optical axis is 5.77 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 61.3°, and an Fno of the optical imaging lens assembly is 2.23.

Table 7 shows a basic parameter table of the optical imaging lens assembly of Embodiment 3, wherein the units of the curvature radius, the thickness/distance and the focal length are all millimeters (mm).

TABLE 7

| Surface number | Surface type | Curvature radius | Thickness/ distance | Refractive Index N | Abbe number V | Focal length | Conic coefficient |
|---|---|---|---|---|---|---|---|
| OBJ | Spherical | Infinite | Infinite | | | | |
| S1 | Aspheric | −2.2904 | 0.5304 | 1.55 | 56.1 | −3.19 | 0.0069 |
| S2 | Aspheric | 11.6998 | 0.5426 | | | | −0.2057 |
| S3 | Aspheric | 2.8873 | 0.4408 | 1.62 | 25.9 | 7.59 | −2.8977 |
| S4 | Aspheric | 6.2760 | 0.2285 | | | | −47.2923 |
| STO | Spherical | Infinite | −0.0141 | | | | |
| S5 | Aspheric | 4.5643 | 0.6235 | 1.55 | 56.1 | 2.59 | −12.8835 |
| S6 | Aspheric | −2.0928 | 0.2568 | | | | 0.2289 |
| S7 | Aspheric | 5.8870 | 0.2700 | 1.68 | 19.2 | −5.74 | 11.0328 |
| S8 | Aspheric | 2.1655 | 0.1075 | | | | −0.7546 |
| S9 | Aspheric | 138.9093 | 1.0628 | 1.54 | 55.6 | 1.42 | −33.6715 |
| S10 | Aspheric | −0.7448 | 0.0609 | | | | −1.0651 |
| S11 | Aspheric | 2.2904 | 0.4666 | 1.65 | 23.5 | −1.91 | 0.0841 |
| S12 | Aspheric | 0.7386 | 0.4851 | | | | −0.9960 |
| S13 | Spherical | Infinite | 0.2100 | 1.52 | 64.2 | | |
| S14 | Spherical | Infinite | 0.4954 | | | | |
| S15 | Spherical | Infinite | | | | | |

In Embodiment 3, both the object-side surface and the image-side surface of any lens in the first lens E1 to the sixth lens E6 are aspheric surfaces. Table 8 and Table 9 show higher-order coefficients A4, A6, A8, A10, A12, A14, A16, A18, A20, A22, A24, A26, A28, and A30 that can be used for each of the aspheric mirror surfaces S1-S16 in Embodiment 3.

TABLE 8

| Surface number | A4 | A6 | A8 | A10 | A12 | A14 | A16 |
|---|---|---|---|---|---|---|---|
| S1 | 4.1805E−01 | −5.8907E−01 | 8.6664E−01 | −1.0804E+00 | 1.0507E+00 | −7.7227E−01 | 4.2358E−01 |
| S2 | 5.4245E−01 | −1.2295E+00 | 5.4459E+00 | −2.3657E+01 | 7.8113E+01 | −1.8873E+02 | 3.3326E+02 |
| S3 | 5.6733E−02 | −3.5847E−01 | 1.5136E+00 | −5.8797E+00 | 1.5281E+01 | −2.5356E+01 | 2.5653E+01 |
| S4 | 9.4390E−02 | −2.4754E−02 | −3.2426E−02 | −1.0746E+00 | 1.6647E+01 | −7.8694E+01 | 1.8010E+02 |
| S5 | 1.1009E−02 | 3.8441E−01 | −7.8846E+00 | 8.1174E+01 | −5.4757E+02 | 2.3115E+03 | −5.9068E+03 |
| S6 | −2.4950E−01 | 1.4121E−01 | 5.0466E−02 | −8.5724E+00 | 5.7278E+01 | −1.9686E+02 | 3.7484E+02 |
| S7 | −6.1562E−01 | 2.6925E−01 | 6.5968E+00 | −6.5544E+01 | 3.1070E+02 | −8.8776E+02 | 1.6000E+03 |
| S8 | −5.7805E−01 | 2.1176E−01 | 5.8741E+00 | −3.1422E+01 | 8.7667E+01 | −1.5472E+02 | 1.8137E+02 |
| S9 | −2.0028E−01 | −3.6586E−01 | 1.4346E+00 | 1.5812E+01 | −1.1558E+02 | 3.7663E+02 | −7.6477E+02 |
| S10 | 3.0714E−01 | −1.1017E+00 | 3.1250E+00 | −3.6489E+00 | −4.5670E+00 | 2.4104E+01 | −4.2143E+01 |
| S11 | −3.4921E−01 | −8.0743E−01 | 5.7584E+00 | −1.5800E+01 | 2.6941E+01 | −3.1702E+01 | 2.6775E+01 |
| S12 | −1.2101E+00 | 2.1392E+00 | −2.9949E+00 | 3.1511E+00 | −2.4738E+00 | 1.4481E+00 | −6.3247E−01 |

TABLE 9

| Surface number | A18 | A20 | A22 | A24 | A26 | A28 | A30 |
|---|---|---|---|---|---|---|---|
| S1 | −1.7178E−01 | 5.0835E−02 | −1.0731E−02 | 1.5531E−03 | −1.4359E−04 | 7.3704E−06 | −1.4721E−07 |
| S2 | −4.3117E+02 | 4.0728E+02 | −2.7710E+02 | 1.3200E+02 | −4.1710E+01 | 7.8425E+00 | −6.6325E−01 |
| S3 | −1.4222E+01 | 3.2535E+00 | 0.0000E+00 | 0.0000E+00 | 0.0000E+00 | 0.0000E+00 | 0.0000E+00 |
| S4 | −1.9775E+02 | 7.8571E+01 | 0.0000E+00 | 0.0000E+00 | 0.0000E+00 | 0.0000E+00 | 0.0000E+00 |
| S5 | 8.2883E+03 | −4.8558E+03 | 0.0000E+00 | 0.0000E+00 | 0.0000E+00 | 0.0000E+00 | 0.0000E+00 |
| S6 | −3.7830E+02 | 1.5821E+02 | 0.0000E+00 | 0.0000E+00 | 0.0000E+00 | 0.0000E+00 | 0.0000E+00 |
| S7 | −1.7837E+03 | 1.1218E+03 | −3.0310E+02 | 0.0000E+00 | 0.0000E+00 | 0.0000E+00 | 0.0000E+00 |
| S8 | −1.4134E+02 | 7.0496E+01 | −2.0381E+01 | 2.5972E+00 | 0.0000E+00 | 0.0000E+00 | 0.0000E+00 |
| S9 | 1.0633E+03 | −1.0477E+03 | 7.3557E+02 | −3.6136E+02 | 1.1837E+02 | −2.3266E+01 | 2.0773E+00 |
| S10 | 4.2304E+01 | −2.6442E+01 | 1.0181E+01 | −2.2143E+00 | 2.0825E−01 | 0.0000E+00 | 0.0000E+00 |
| S11 | −1.6483E+01 | 7.4073E+00 | −2.4031E+00 | 5.4769E−01 | −8.3134E−02 | 7.5406E−03 | −3.0896E−04 |
| S12 | 2.0578E−01 | −4.9539E−02 | 8.6877E−03 | −1.0775E−03 | 8.9495E−05 | −4.4628E−06 | 1.0097E−07 |

Figure 6A:
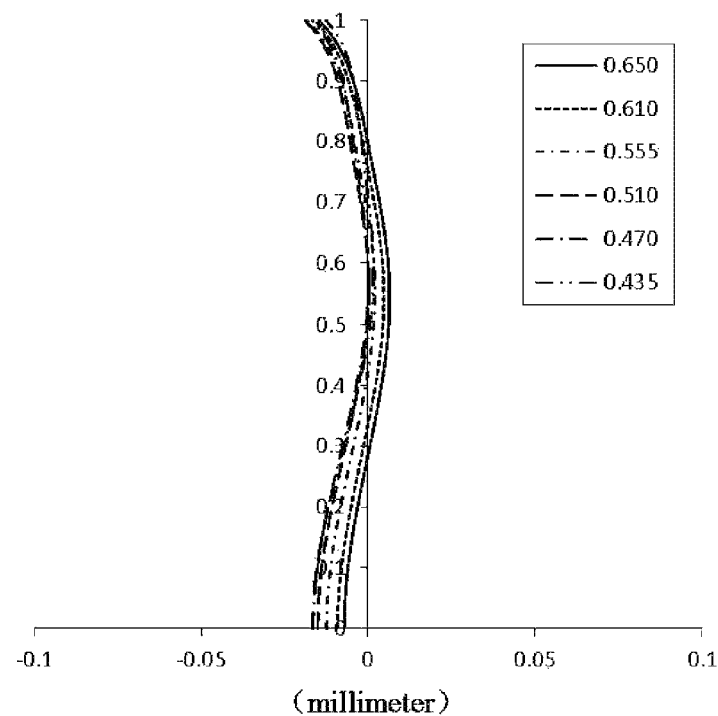
FIGS. 6A-6D show a longitudinal aberration curve, an astigmatism curve, a distortion curve and a lateral color curve of an optical imaging lens assembly according to Embodiment 3 respectively.
Figure 6B:
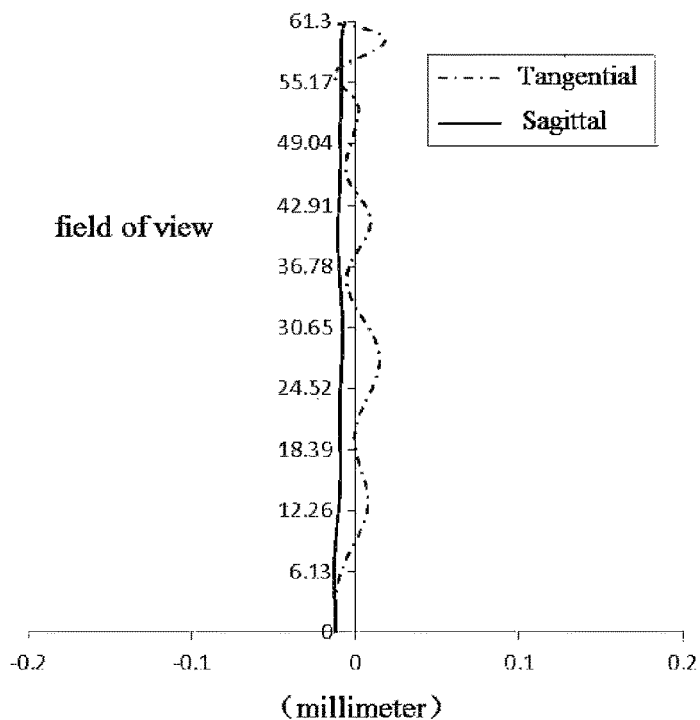
Figure 6C:
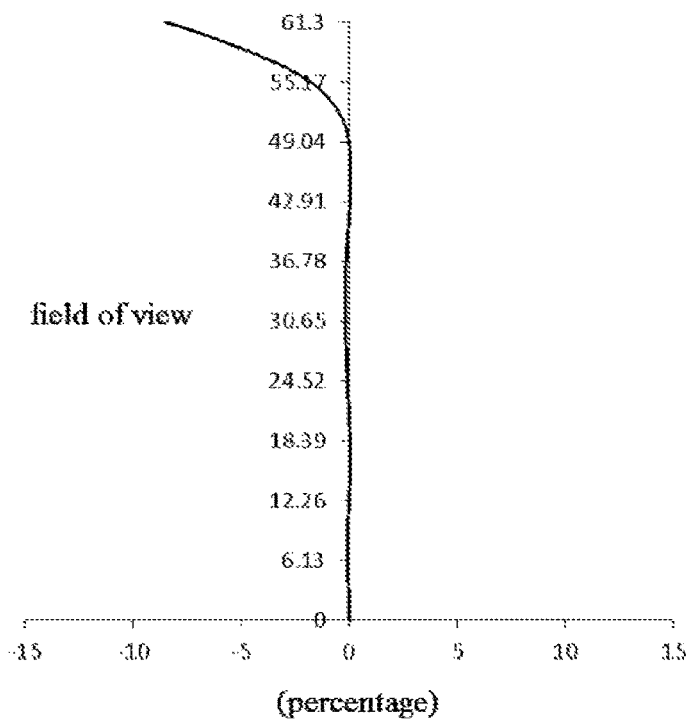
Figure 6D:
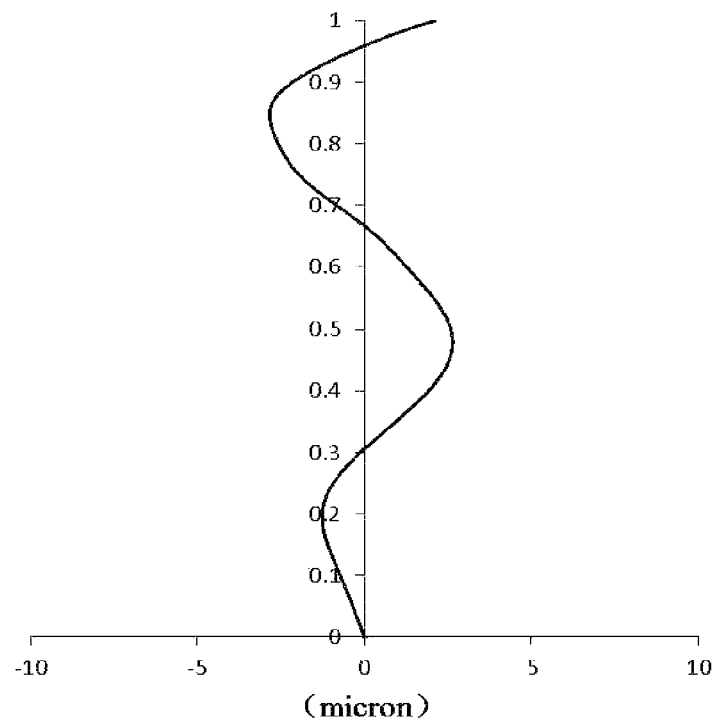

FIG. 6A shows a longitudinal aberration curve of the optical imaging lens assembly according to Embodiment 3 to represent deviation of a convergence focal point after light with different wavelengths passes through the lens. FIG. 6B shows an astigmatism curve of the optical imaging lens assembly according to Embodiment 3 to represent a curvature of tangential image surface and a curvature of sagittal image surface. FIG. 6C shows a distortion curve of the optical imaging lens assembly according to Embodiment 3 to represent distortion values corresponding to different fields of view. FIG. 6D shows a lateral color curve of the optical imaging lens assembly according to Embodiment 3 to represent deviation of different image heights on the imaging surface after the light passes through the lens. According to FIGS. 6A-6D, it can be seen that the optical imaging lens assembly provided in Embodiment 3 may achieve high imaging quality.

Embodiment 4

Figure 7:
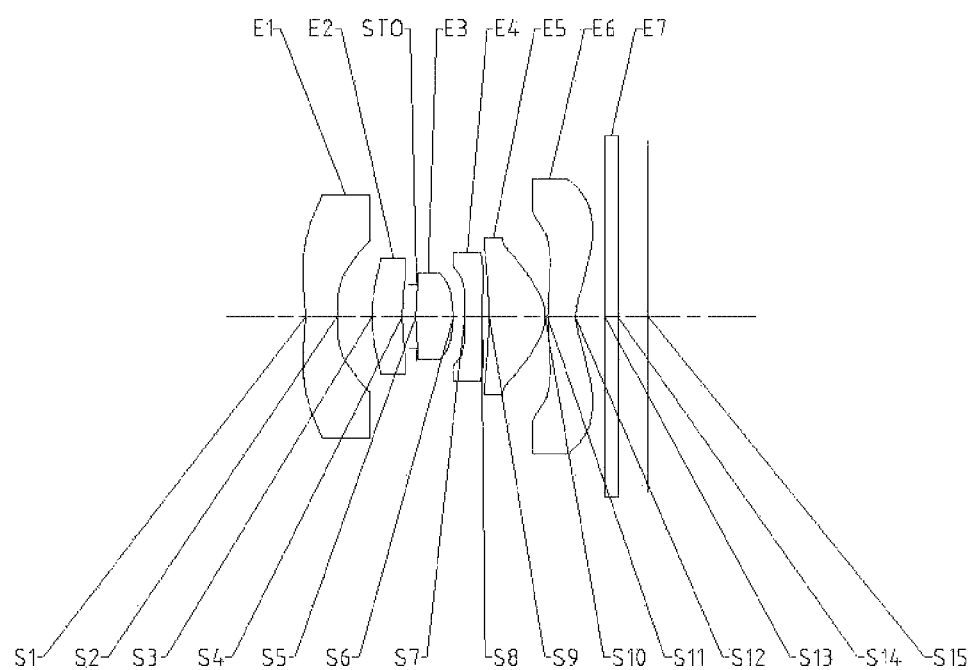
FIG. 7 shows a structural schematic diagram of an optical imaging lens assembly according to Embodiment 4 of the disclosure.

An optical imaging lens assembly according to Embodiment 4 of the disclosure will be described below with reference to FIGS. 7-8D. FIG. 7 shows a structural schematic diagram of an optical imaging lens assembly according to Embodiment 4 of the disclosure.

As shown in FIG. 7, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.70 mm, a distance TTL from the object-side surface S1 of the first lens E1 to the imaging surface S15 on the optical axis is 5.68 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 61.5°, and an Fno of the optical imaging lens assembly is 2.23.

Table 10 shows a basic parameter table of the optical imaging lens assembly of Embodiment 4, wherein the units of the curvature radius, the thickness/distance and the focal length are all millimeters (mm).

TABLE 10

| Surface number | Surface type | Curvature radius | Thickness/ distance | Material Refractive Index N | Material Abbe number V | Focal length | Conic coefficient |
|---|---|---|---|---|---|---|---|
| OBJ | Spherical | Infinite | Infinite | | | | |
| S1 | Aspheric | −2.3112 | 0.5177 | 1.55 | 56.1 | −3.07 | 0.0015 |
| S2 | Aspheric | 6.5840 | 0.5784 | | | | 0.0457 |
| S3 | Aspheric | 2.3149 | 0.5025 | 1.62 | 25.9 | 6.12 | −2.5466 |
| S4 | Aspheric | 5.4598 | 0.2385 | | | | −57.3249 |
| STO | Spherical | Infinite | −0.0133 | | | | |
| S5 | Aspheric | 4.2558 | 0.6235 | 1.55 | 56.1 | 2.56 | −16.3288 |
| S6 | Aspheric | −1.9703 | 0.1901 | | | | 0.5649 |
| S7 | Aspheric | 7.8798 | 0.2700 | 1.68 | 19.2 | −5.05 | 15.4641 |
| S8 | Aspheric | 2.3544 | 0.1372 | | | | −0.6258 |
| S9 | Aspheric | −13.1841 | 0.9225 | 1.54 | 55.6 | 1.41 | 17.8640 |
| S10 | Aspheric | −0.7346 | 0.0404 | | | | −1.1231 |

TABLE 10-continued

| Surface number | Surface type | Curvature radius | Thickness/ distance | Material Refractive Index N | Abbe number V | Focal length | Conic coefficient |
|---|---|---|---|---|---|---|---|
| S11 | Aspheric | 2.2555 | 0.4572 | 1.65 | 23.5 | −2.01 | 0.1115 |
| S12 | Aspheric | 0.7568 | 0.4992 | | | | −0.9971 |
| S13 | Spherical | Infinite | 0.2100 | 1.52 | 64.2 | | |
| S14 | Spherical | Infinite | 0.5096 | | | | |
| S15 | Spherical | Infinite | | | | | |

In Embodiment 4, both the object-side surface and the image-side surface of any lens in the first lens E1 to the sixth lens E6 are aspheric surfaces. Table 11 and Table 12 show higher-order coefficients A4, A6, A8, A10, A12, A14, A16, A18, A20, A22, A24, A26, A28, and A30 that can be used for each of the aspheric mirror surfaces S1-S16 in Embodiment 4.

TABLE 11

| Surface number | A4 | A6 | A8 | A10 | A12 | A14 | A16 |
|---|---|---|---|---|---|---|---|
| S1 | 4.2140E−01 | −5.9199E−01 | 8.7770E−01 | −1.1095E+00 | 1.0983E+00 | −8.2592E−01 | 4.6735E−01 |
| S2 | 5.4833E−01 | −1.4784E+00 | 8.9972E+00 | −4.6884E+01 | 1.7184E+02 | −4.4378E+02 | 8.2197E+02 |
| S3 | 5.1487E−02 | −3.3021E−01 | 1.4282E+00 | −5.4670E+00 | 1.3941E+01 | −2.2790E+01 | 2.2900E+01 |
| S4 | 8.9384E−02 | −3.7922E−02 | 4.0529E−01 | −6.1368E+00 | 4.5057E+01 | −1.7669E+02 | 3.9509E+02 |
| S5 | −3.0377E−03 | 8.5596E−01 | −1.9740E+01 | 2.6323E+02 | −2.2647E+03 | 1.2241E+04 | −4.0163E+04 |
| S6 | −2.1443E−01 | −1.3307E+00 | 2.0332E+01 | −1.6807E+02 | 8.3246E+02 | −2.5527E+03 | 4.7218E+03 |
| S7 | −5.7829E−01 | −8.8809E−01 | 1.7840E+01 | −1.2665E+02 | 5.1671E+02 | −1.3244E+03 | 2.1697E+03 |
| S8 | −6.0608E−01 | 1.0397E+00 | −4.8363E−01 | −2.4292E+00 | 1.4351E+00 | 1.7031E+01 | −4.8440E+01 |
| S9 | −2.2487E−01 | 1.3337E−01 | 1.7732E+00 | −1.0887E+01 | 5.9418E+01 | −2.3489E+02 | 6.0402E+02 |
| S10 | 3.8070E−01 | −1.9048E+00 | 8.4736E+00 | −2.6433E+01 | 5.8976E+01 | −9.4326E+01 | 1.0785E+02 |
| S11 | −3.4366E−01 | −8.1309E−01 | 5.6693E+00 | −1.5396E+01 | 2.6098E+01 | −3.0614E+01 | 2.5804E+01 |
| S12 | −1.2501E+00 | 2.2430E+00 | −3.1758E+00 | 3.3710E+00 | −2.6630E+00 | 1.5646E+00 | −6.8421E−01 |

TABLE 12

| Surface number | A18 | A20 | A822 | A24 | A26 | A28 | A30 |
|---|---|---|---|---|---|---|---|
| S1 | −1.9791E−01 | 6.2169E−02 | −1.4243E−02 | 2.3074E−03 | −2.5001E−04 | 1.6228E−05 | −4.7654E−07 |
| S2 | −1.1041E+03 | 1.0765E+03 | −7.5323E+02 | 3.6815E+02 | −1.1918E+02 | 2.2937E+01 | −1.9846E+00 |
| S3 | −1.2806E+01 | 3.0326E+00 | 0.0000E+00 | 0.0000E+00 | 0.0000E+00 | 0.0000E+00 | 0.0000E+00 |
| S4 | −4.7613E+02 | 2.3923E+02 | 0.0000E+00 | 0.0000E+00 | 0.0000E+00 | 0.0000E+00 | 0.0000E+00 |
| S5 | 7.2843E+04 | −5.5917E+04 | 0.0000E+00 | 0.0000E+00 | 0.0000E+00 | 0.0000E+00 | 0.0000E+00 |
| S6 | −4.8263E+03 | 2.0916E+03 | 0.0000E+00 | 0.0000E+00 | 0.0000E+00 | 0.0000E+00 | 0.0000E+00 |
| S7 | −2.2137E+03 | 1.2823E+03 | −3.2093E+02 | 0.0000E+00 | 0.0000E+00 | 0.0000E+00 | 0.0000E+00 |
| S8 | 6.1930E+01 | −4.3229E+01 | 1.6017E+01 | −2.4747E+00 | 0.0000E+00 | 0.0000E+00 | 0.0000E+00 |
| S9 | −1.0301E+03 | 1.1954E+03 | −9.5211E+02 | 5.1342E+02 | −1.7939E+02 | 3.6681E+01 | −3.3337E+00 |
| S10 | −8.7186E+01 | 4.8535E+01 | −1.7658E+01 | 3.7726E+00 | −3.5847E−01 | 0.0000E+00 | 0.0000E+00 |
| S11 | −1.5855E+01 | 7.1088E+00 | −2.2998E+00 | 5.2256E−01 | −7.9084E−02 | 7.1551E−03 | −2.9265E−04 |
| S12 | 2.2230E−01 | −5.3259E−02 | 9.2544E−03 | −1.1308E−03 | 9.1845E−05 | −4.4381E−06 | 9.6204E−08 |

Figure 8A:
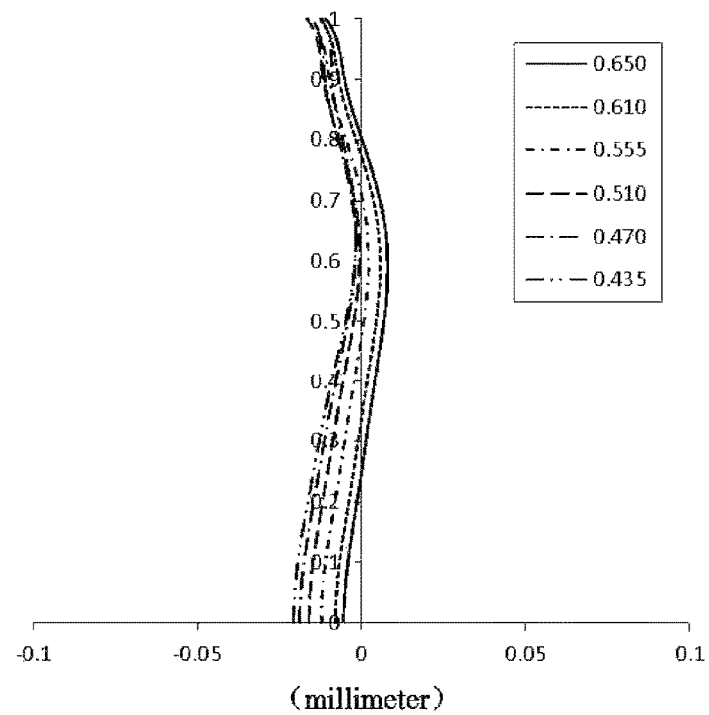
FIGS. 8A-8D show a longitudinal aberration curve, an astigmatism curve, a distortion curve and a lateral color curve of an optical imaging lens assembly according to Embodiment 4 respectively.
Figure 8B:
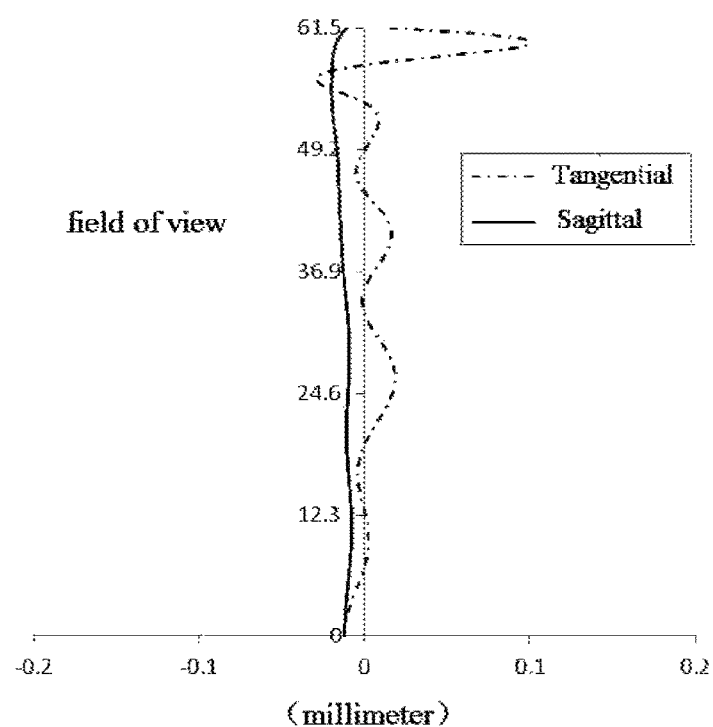
Figure 8C:
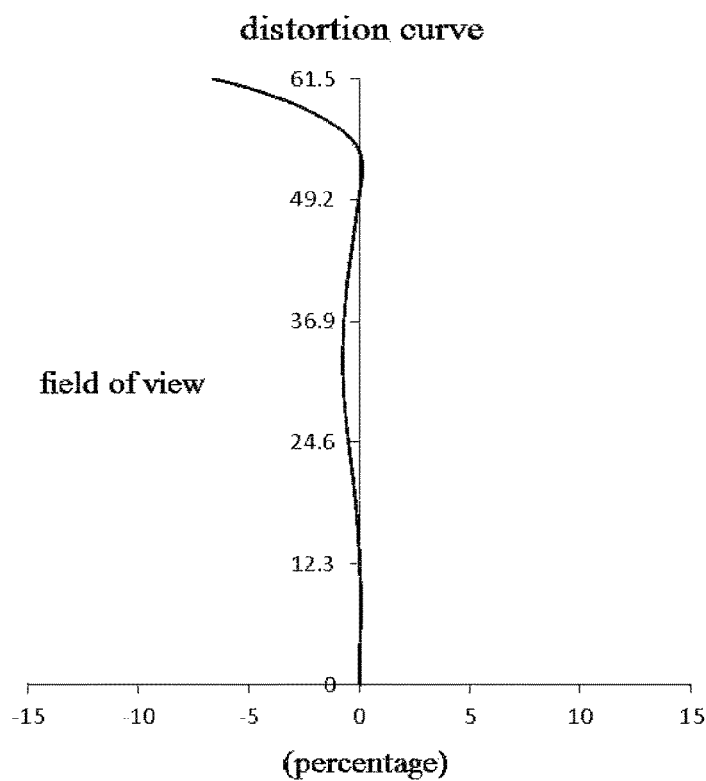
Figure 8D:
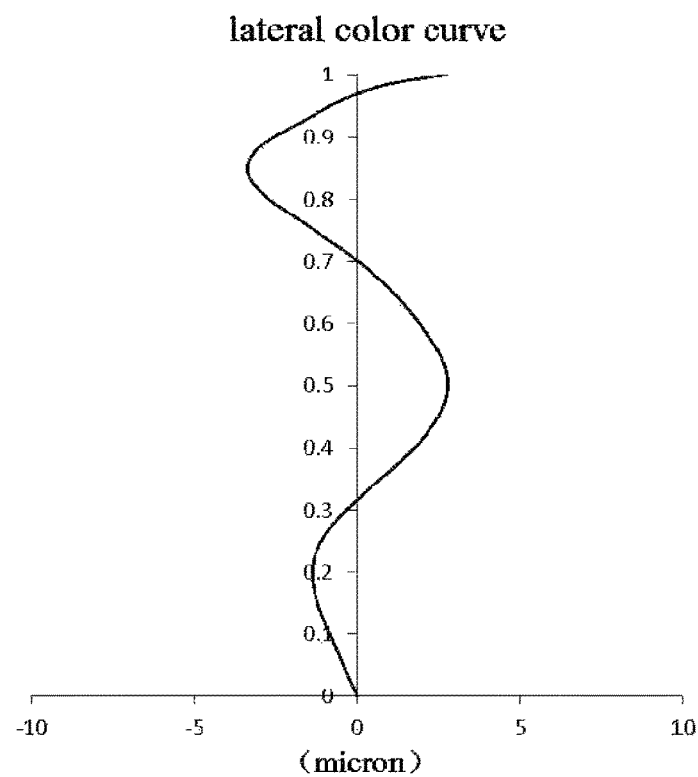

FIG. 8A shows a longitudinal aberration curve of the optical imaging lens assembly according to Embodiment 4 to represent deviation of a convergence focal point after light with different wavelengths passes through the lens. FIG. 8B shows an astigmatism curve of the optical imaging lens assembly according to Embodiment 4 to represent a curvature of tangential image surface and a curvature of sagittal image surface. FIG. 8C shows a distortion curve of the optical imaging lens assembly according to Embodiment 4 to represent distortion values corresponding to different fields of view. FIG. 8D shows a lateral color curve of the optical imaging lens assembly according to Embodiment 4 to represent deviation of different image heights on the imaging surface after the light passes through the lens. According to FIGS. 8A-8D, it can be seen that the optical imaging lens assembly provided in Embodiment 4 may achieve high imaging quality.

Embodiment 5

Figure 9:
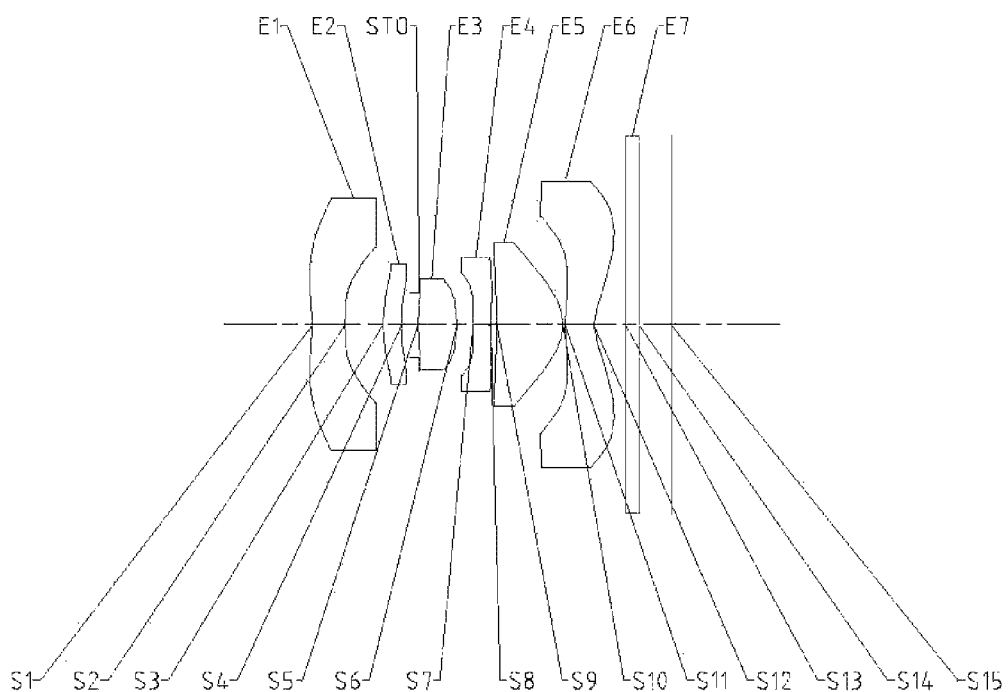
FIG. 9 shows a structural schematic diagram of an optical imaging lens assembly according to Embodiment 5 of the disclosure.

An optical imaging lens assembly according to Embodiment 5 of the disclosure will be described below with reference to FIGS. 9-10D. FIG. 9 shows a structural schematic diagram of an optical imaging lens assembly according to Embodiment 5 of the disclosure.

As shown in FIG. 9, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.81 mm, a distance TTL from the object-side surface S1 of the first lens E1 to the imaging surface S15 on the optical axis is 5.71 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 60.6°, and an Fno of the optical imaging lens assembly is 2.23.

Table 13 shows a basic parameter table of the optical imaging lens assembly of Embodiment 5, wherein the units of the curvature radius, the thickness/distance and the focal length are all millimeters (mm).

TABLE 13

| Surface number | Surface type | Curvature radius | Thickness/distance | Material Refractive Index N | Abbe number V | Focal length | Conic coefficient |
|---|---|---|---|---|---|---|---|
| OBJ | Spherical | Infinite | Infinite | | | | |
| S1 | Aspheric | −2.3215 | 0.5171 | 1.55 | 56.1 | −3.45 | 0.0024 |
| S2 | Aspheric | 10.8013 | 0.6005 | | | | 0.0777 |
| S3 | Aspheric | 2.3707 | 0.3003 | 1.62 | 25.9 | 7.66 | −2.6796 |
| S4 | Aspheric | 4.5117 | 0.2765 | | | | −36.3959 |
| STO | Spherical | Infinite | −0.0160 | | | | |
| S5 | Aspheric | 4.2173 | 0.6221 | 1.55 | 56.1 | 2.64 | −13.3206 |
| S6 | Aspheric | −2.0814 | 0.2560 | | | | 0.1610 |
| S7 | Aspheric | 7.1688 | 0.2700 | 1.68 | 19.2 | −5.36 | 10.5633 |
| S8 | Aspheric | 2.3735 | 0.1086 | | | | −0.3059 |
| S9 | Aspheric | −43.5309 | 1.0512 | 1.54 | 55.6 | 1.42 | 42.6442 |
| S10 | Aspheric | −0.7576 | 0.0328 | | | | −1.0668 |
| S11 | Aspheric | 2.2152 | 0.4627 | 1.65 | 23.5 | −1.89 | 0.0834 |
| S12 | Aspheric | 0.7218 | 0.5060 | | | | −1.0003 |
| S13 | Spherical | Infinite | 0.2100 | 1.52 | 64.2 | | |
| S14 | Spherical | Infinite | 0.5164 | | | | |
| S15 | Spherical | Infinite | | | | | |

In Embodiment 5, both the object-side surface and the image-side surface of any lens in the first lens E1 to the sixth lens E6 are aspheric surfaces. Table 14 and Table 15 show higher-order coefficients A4, A6, A8, A10, A12, A14, A16, A18, A20, A22, A24, A26, A28, and A30 that can be used for each of the aspheric mirror surfaces S1-S16 in Embodiment 5.

TABLE 14

| Surface number | A4 | A6 | A8 | A10 | A12 | A14 | A16 |
|---|---|---|---|---|---|---|---|
| S1 | 4.2495E−01 | −6.1532E−01 | 9.4601E−01 | −1.2258E+00 | 1.2302E+00 | −9.2837E−01 | 5.2185E−01 |
| S2 | 5.3095E−01 | −9.6566E−01 | 3.1391E+00 | −1.0079E+01 | 2.4504E+01 | −4.1224E+01 | 4.4993E+01 |
| S3 | 6.7855E−02 | −3.8673E−01 | 1.7594E+00 | −8.3742E+00 | 2.6603E+01 | −5.3161E+01 | 6.4038E+01 |
| S4 | 1.1825E−01 | −1.5753E−01 | 6.7002E−01 | −5.8505E+00 | 3.9667E+01 | −1.4869E+02 | 3.0891E+02 |
| S5 | 8.4246E−03 | 3.7170E−01 | −7.1345E+00 | 6.9128E+01 | −4.3668E+02 | 1.7251E+03 | −4.1238E+03 |
| S6 | −2.5761E−01 | 1.6119E−01 | 3.2161E−01 | −1.0996E+01 | 6.6411E+01 | −2.1315E+02 | 3.8443E+02 |
| S7 | −6.3510E−01 | 5.9478E−01 | 2.7180E+00 | −3.8129E+01 | 1.9349E+02 | −5.6815E+02 | 1.0345E+03 |
| S8 | −5.6333E−01 | 3.6772E+00 | 4.2586E+00 | −2.4777E+01 | 7.2568E+01 | −1.3363E+02 | 1.6270E+02 |
| S9 | −1.2081E−01 | −8.5145E−01 | 5.9380E+00 | −1.4005E+01 | 6.5178E+00 | 4.7126E+01 | −1.4575E+02 |
| S10 | 3.2771E−01 | −1.4400E+00 | 5.6533E+00 | −1.3232E+01 | 1.7889E+01 | −1.1282E+01 | −3.4298E+00 |
| S11 | −4.0229E−01 | −9.9110E−01 | 7.6173E+00 | −2.2821E+01 | 4.2697E+01 | −5.5316E+01 | 5.1577E+01 |
| S12 | −1.2946E+00 | 2.3598E+00 | −3.4152E+00 | 3.7085E+00 | −2.9999E+00 | 1.8080E+00 | −8.1232E−01 |

TABLE 15

| Surface number | A18 | A20 | A822 | A24 | A26 | A28 | A30 |
|---|---|---|---|---|---|---|---|
| S1 | −2.1730E−01 | 6.6433E−02 | −1.4659E−02 | 2.2627E−03 | −2.3075E−04 | 1.3894E−05 | −3.7135E−07 |
| S2 | −2.7421E+01 | 1.8247E+00 | 1.1944E+01 | −1.0677E+01 | 4.6400E+00 | −1.0732E+00 | 1.0642E−01 |
| S3 | −4.2016E+01 | 1.1408E+01 | 0.0000E+00 | 0.0000E+00 | 0.0000E+00 | 0.0000E+00 | 0.0000E+00 |

TABLE 15-continued

| Surface number | A18 | A20 | A822 | A24 | A26 | A28 | A30 |
|---|---|---|---|---|---|---|---|
| S4 | −3.2988E+02 | 1.3953E+02 | 0.0000E+00 | 0.0000E+00 | 0.0000E+00 | 0.0000E+00 | 0.0000E+00 |
| S5 | 5.4063E+03 | −2.9652E+03 | 0.0000E+00 | 0.0000E+00 | 0.0000E+00 | 0.0000E+00 | 0.0000E+00 |
| S6 | −3.6925E+02 | 1.4659E+02 | 0.0000E+00 | 0.0000E+00 | 0.0000E+00 | 0.0000E+00 | 0.0000E+00 |
| S7 | −1.1532E+03 | 7.1943E+02 | −1.9144E+02 | 0.0000E+00 | 0.0000E+00 | 0.0000E+00 | 0.0000E+00 |
| S8 | −1.3112E+02 | 6.7388E+01 | −2.0020E+01 | 2.6173E+00 | 0.0000E+00 | 0.0000E+00 | 0.0000E+00 |
| S9 | 2.2862E+02 | −2.3075E+02 | 1.5837E+02 | −7.4033E+01 | 2.2700E+01 | −4.1350E+00 | 3.4040E−01 |
| S10 | 1.2773E+01 | −1.1020E+01 | 4.9241E+00 | −1.1610E+00 | 1.1428E−01 | 0.0000E+00 | 0.0000E+00 |
| S11 | −3.5128E+01 | 1.7487E+01 | −6.2868E+00 | 1.5872E+00 | −2.6666E−01 | 2.6741E−02 | −1.2099E−03 |
| S12 | 2.7150E−01 | −6.6995E−02 | 1.2010E−02 | −1.5178E−03 | 1.2804E−04 | −6.4640E−06 | 1.4760E−07 |

Figure 10A:
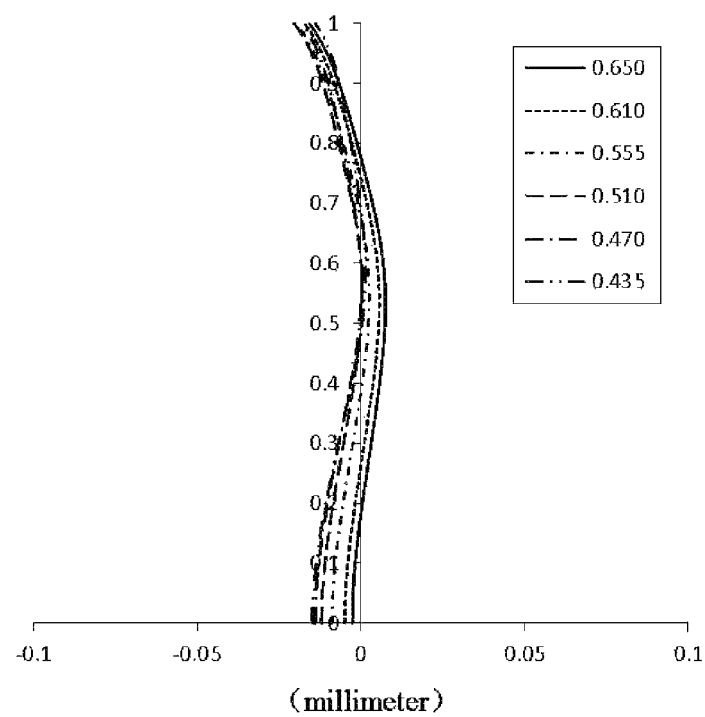
FIGS. 10A-10D show a longitudinal aberration curve, an astigmatism curve, a distortion curve and a lateral color curve of an optical imaging lens assembly according to Embodiment 5 respectively.
Figure 10B:
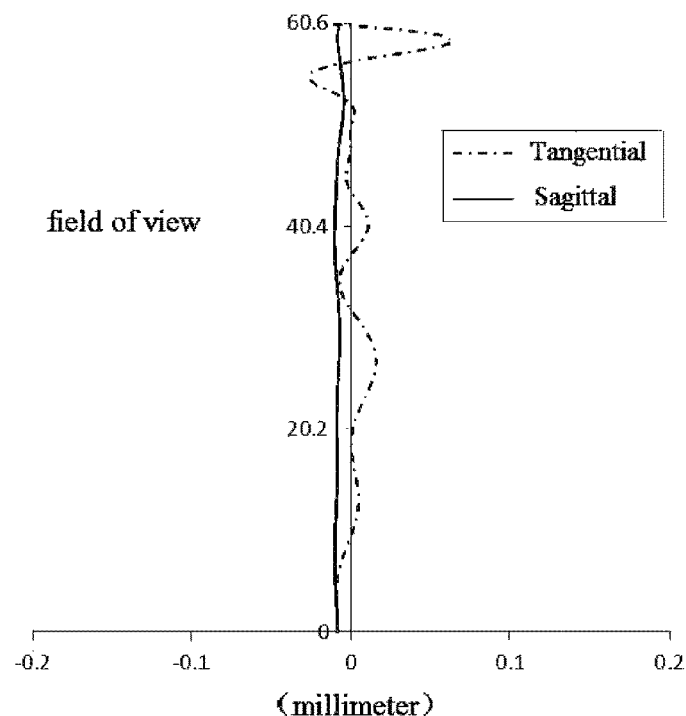
Figure 10C:
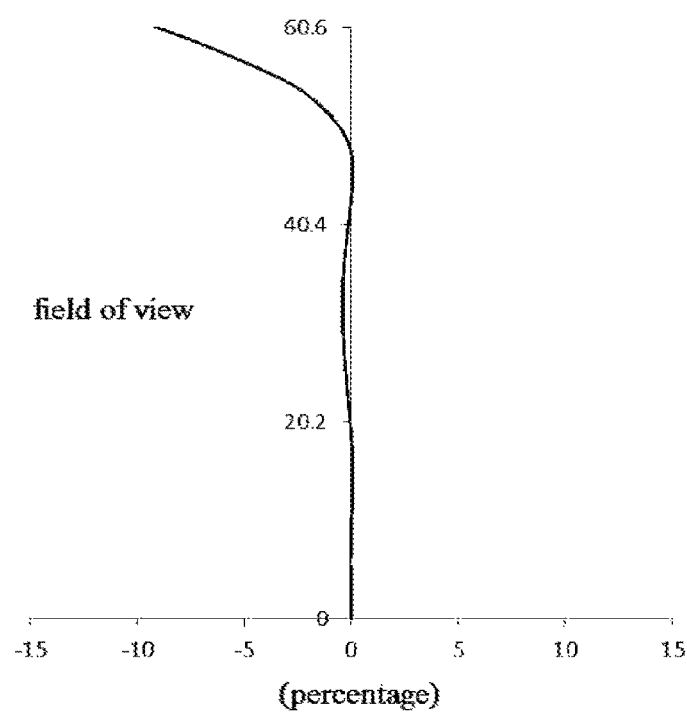
Figure 10D:
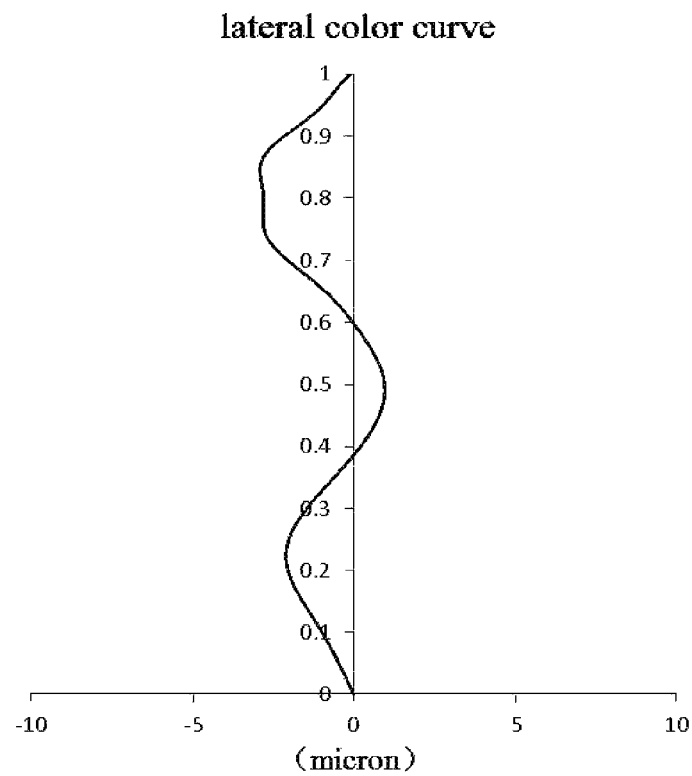

FIG. 10A shows a longitudinal aberration curve of the optical imaging lens assembly according to Embodiment 5 to represent deviation of a convergence focal point after light with different wavelengths passes through the lens. FIG. 10B shows an astigmatism curve of the optical imaging lens assembly according to Embodiment 5 to represent a curvature of tangential image surface and a curvature of sagittal image surface. FIG. 10C shows a distortion curve of the optical imaging lens assembly according to Embodiment 5 to represent distortion values corresponding to different fields of view. FIG. 10D shows a lateral color curve of the optical imaging lens assembly according to Embodiment 5 to represent deviation of different image heights on the imaging surface after the light passes through the lens. According to FIGS. 10A-10D, it can be seen that the optical imaging lens assembly provided in Embodiment 5 may achieve high imaging quality.

Embodiment 6

Figure 11:
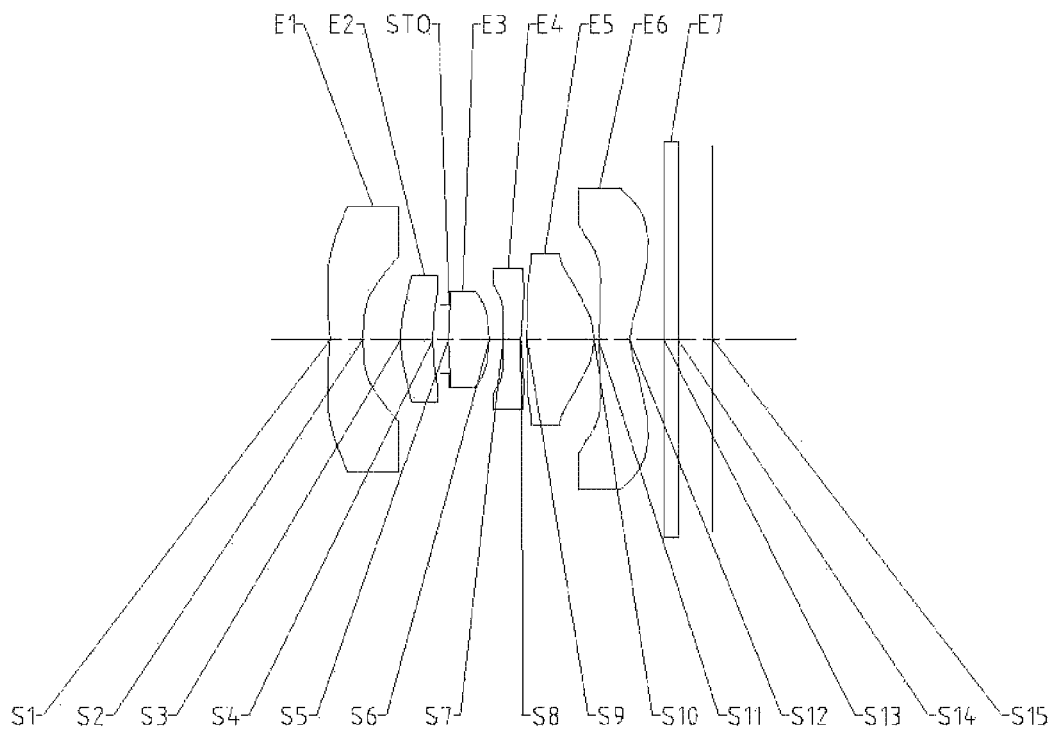
FIG. 11 shows a structural schematic diagram of an optical imaging lens assembly according to Embodiment 6 of the disclosure.

An optical imaging lens assembly according to Embodiment 6 of the disclosure will be described below with reference to FIGS. 11-12D. FIG. 11 shows a structural schematic diagram of an optical imaging lens assembly according to Embodiment 6 of the disclosure.

As shown in FIG. 11, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.85 mm, a distance TTL from the object-side surface S1 of the first lens E1 to the imaging surface S15 on the optical axis is 5.83 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 60.0°, and an Fno of the optical imaging lens assembly is 2.23.

Table 16 shows a basic parameter table of the optical imaging lens assembly of Embodiment 6, wherein the units of the curvature radius, the thickness/distance and the focal length are all millimeters (mm).

TABLE 16

| Surface number | Surface type | Curvature radius | Thickness/ distance | Material Refractive Index N | Material Abbe number V | Focal length | Conic coefficient |
|---|---|---|---|---|---|---|---|
| OBJ | Spherical | Infinite | Infinite | | | | |
| S1 | Aspheric | −2.3137 | 0.4977 | 1.55 | 56.1 | −2.92 | 0.0003 |
| S2 | Aspheric | 5.5163 | 0.5759 | | | | 0.0772 |
| S3 | Aspheric | 2.1629 | 0.4920 | 1.62 | 25.9 | 5.92 | −2.7288 |
| S4 | Aspheric | 4.8174 | 0.2471 | | | | −51.7475 |
| STO | Spherical | Infinite | −0.0117 | | | | |
| S5 | Aspheric | 4.3613 | 0.6220 | 1.55 | 56.1 | 2.71 | −19.8650 |
| S6 | Aspheric | −2.1292 | 0.2124 | | | | 0.3255 |
| S7 | Aspheric | 6.1393 | 0.2700 | 1.68 | 19.2 | −4.77 | 32.6927 |
| S8 | Aspheric | 2.0794 | 0.0914 | | | | −0.7237 |
| S9 | Aspheric | 11.1007 | 1.0248 | 1.54 | 55.6 | 1.52 | −90.0000 |
| S10 | Aspheric | −0.8534 | 0.0635 | | | | −1.2164 |
| S11 | Aspheric | 2.2237 | 0.4751 | 1.65 | 23.5 | −2.07 | 0.1067 |
| S12 | Aspheric | 07644 | 0.5256 | | | | −0.9969 |
| S13 | Spherical | Infinite | 0.2100 | 1.52 | 64.2 | | |
| S14 | Spherical | Infinite | 0.5360 | | | | |
| S15 | Spherical | Infinite | | | | | |

In Embodiment 6, both the object-side surface and the image-side surface of any lens in the first lens E1 to the sixth lens E6 are aspheric surfaces. Table 17 and Table 18 show higher-order coefficients A4, A6, A8, A10, A12, A14, A16, A18, A20, A22, A24, A26, A28, and A30 that can be used for each of the aspheric mirror surfaces S1-S12 in Embodiment 6.

TABLE 17

| Surface number | A4 | A6 | A8 | A10 | A12 | A14 | A16 |
|---|---|---|---|---|---|---|---|
| S1 | 4.1669E−01 | −6.0095E−01 | 9.4565E−01 | −1.2619E+00 | 1.2917E+00 | −9.8602E−01 | 5.5878E−01 |
| S2 | 4.4736E−01 | 7.6309E−02 | −5.5354E+00 | 3.6503E+01 | −1.4050E+02 | 3.5920E+02 | −6.4140E+02 |
| S3 | 5.3424E−02 | −3.4563E−01 | 1.4278E+00 | −5.3720E+00 | 1.3657E+01 | −2.2181E+01 | 2.1991E+01 |
| S4 | 1.0728E−01 | −2.0405E−01 | 1.0675E+00 | −6.9948E+00 | 4.1970E+01 | −1.5610E+02 | 3.3757E+02 |
| S5 | −8.5939E−03 | 8.1939E−01 | −1.8029E+01 | 2.1898E+02 | −1.6581E+03 | 7.7480E+03 | −2.1748E+04 |
| S6 | −2.0418E−01 | −8.7192E−01 | 1.0509E+01 | −7.2131E+01 | 3.0027E+02 | −7.9037E+02 | 1.2747E+03 |
| S7 | −5.5976E−01 | −7.9565E−01 | 1.6639E+01 | −1.1885E+02 | 4.9569E+02 | −1.3098E+03 | 2.2134E+03 |
| S8 | −5.5214E−01 | 2.1606E−01 | 4.6367E+00 | −2.2406E+01 | 5.3746E+01 | −7.4330E+01 | 5.6220E+01 |
| S9 | −3.4549E−02 | −1.1945E+00 | 9.5319E+00 | −4.0760E+01 | 1.2803E+02 | −3.1704E+02 | 6.0976E+02 |
| S10 | 3.6265E−01 | −1.9397E+00 | 8.4372E+00 | −2.2541E+01 | 3.9977E+01 | −4.8604E+01 | 4.0686E+01 |
| S11 | −3.6544E−01 | −1.0988E+00 | 7.5069E+00 | −2.1262E+01 | 3.8136E+01 | −4.7700E+01 | 4.3097E+01 |
| S12 | −1.2350E+00 | 2.2150E+00 | −3.1942E+00 | 3.5053E+00 | −2.8691E+00 | 1.7315E+00 | −7.6517E−01 |

TABLE 18

| Surface number | A18 | A20 | A22 | A24 | A26 | A28 | A30 |
|---|---|---|---|---|---|---|---|
| S1 | −2.3477E−01 | 7.2727E−02 | −1.6375E−02 | 2.6046E−03 | −2.7733E−04 | 1.7733E−05 | −5.1480E−07 |
| S2 | 8.1818E+02 | −7.4984E+02 | 4.8951E+02 | −2.2192E+02 | 6.6351E+01 | −1.1759E+01 | 9.3569E−01 |
| S3 | −1.2025E+01 | 2.7504E+00 | 0.0000E+00 | 0.0000E+00 | 0.0000E+00 | 0.0000E+00 | 0.0000E+00 |
| S4 | −3.8957E+02 | 1.8322E+02 | 0.0000E+00 | 0.0000E+00 | 0.0000E+00 | 0.0000E+00 | 0.0000E+00 |
| S5 | 3.3480E+04 | −2.1655E+04 | 0.0000E+00 | 0.0000E+00 | 0.0000E+00 | 0.0000E+00 | 0.0000E+00 |
| S6 | −1.1500E+03 | 4.4418E+02 | 0.0000E+00 | 0.0000E+00 | 0.0000E+00 | 0.0000E+00 | 0.0000E+00 |
| S7 | −2.3217E+03 | 1.3770E+03 | −3.5217E+02 | 0.0000E+00 | 0.0000E+00 | 0.0000E+00 | 0.0000E+00 |
| S8 | −1.4735E+01 | −9.1063E+00 | 7.7686E+00 | −1.6717E+00 | 0.0000E+00 | 0.0000E+00 | 0.0000E+00 |
| S9 | −8.8097E+02 | 9.2971E+02 | −6.9911E+02 | 3.6288E+02 | −1.2323E+02 | 2.4609E+01 | −2.1897E+00 |
| S10 | −2.3078E+01 | 8.5171E+00 | −1.8804E+00 | 2.0556E−01 | −5.9066E−03 | 0.0000E+00 | 0.0000E+00 |
| S11 | −2.8504E+01 | 1.3807E+01 | −4.8414E+00 | 1.1958E+00 | −1.9723E−01 | 1.9487E−02 | −8.7181E−04 |
| S12 | 2.4561E−01 | −5.6407E−02 | 9.0095E−03 | −9.4876E−04 | 5.9121E−05 | −1.6468E−06 | −2.7321E−10 |

Figure 12A:
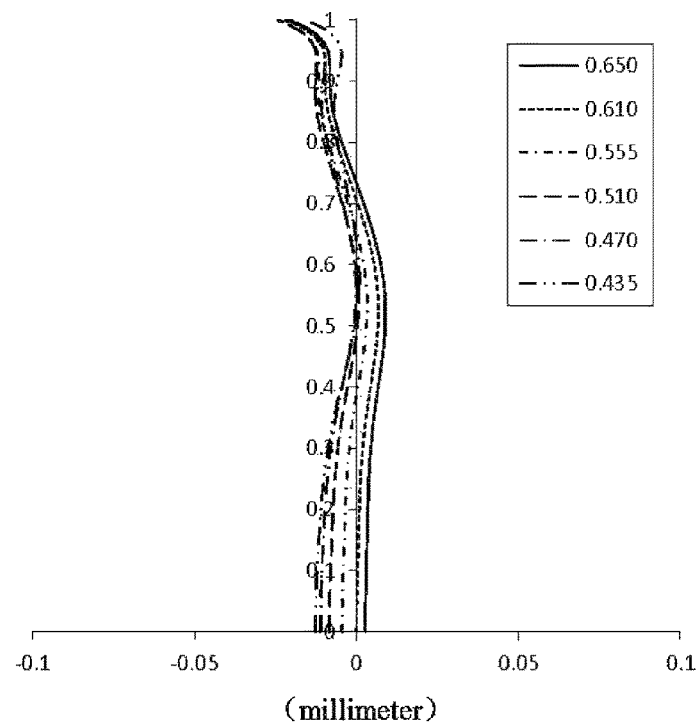
FIGS. 12A-12D show a longitudinal aberration curve, an astigmatism curve, a distortion curve and a lateral color curve of an optical imaging lens assembly according to Embodiment 6 respectively.
Figure 12B:
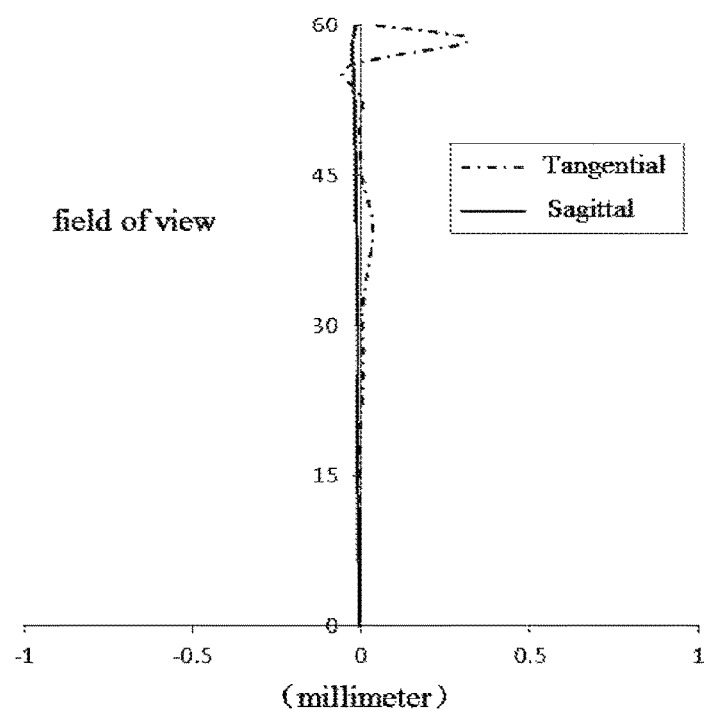
Figure 12C:
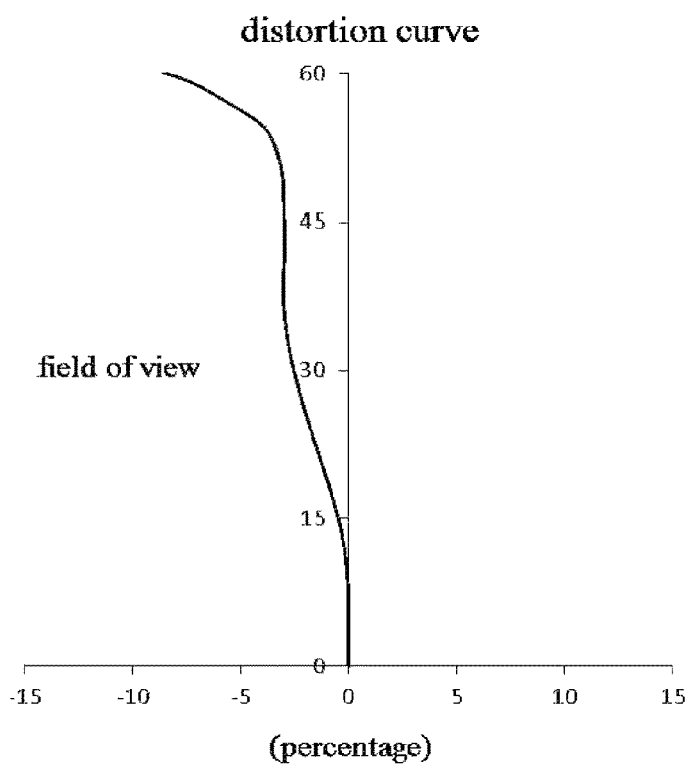
Figure 12D:
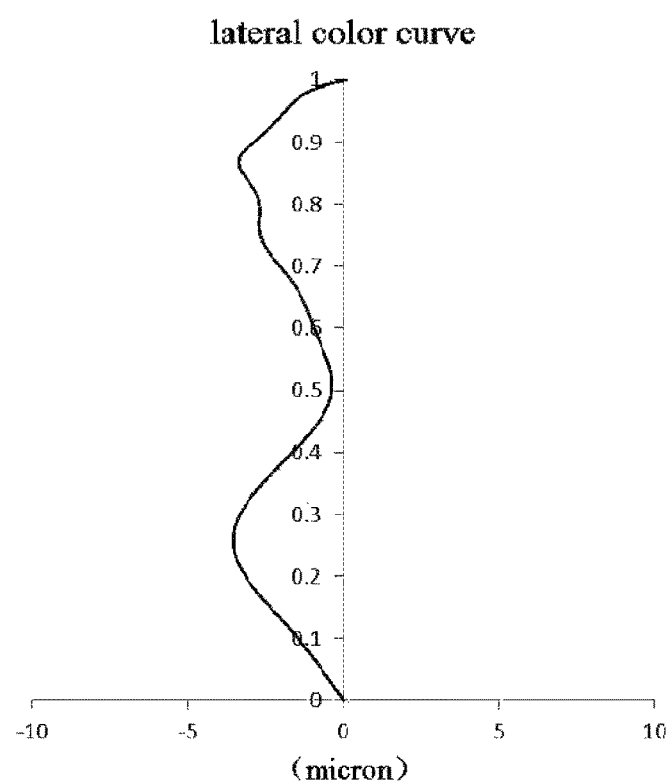

FIG. 12A shows a longitudinal aberration curve of the optical imaging lens assembly according to Embodiment 6 to represent deviation of a convergence focal point after light with different wavelengths passes through the lens. FIG. 12B shows an astigmatism curve of the optical imaging lens assembly according to Embodiment 6 to represent a curvature of tangential image surface and a curvature of sagittal image surface. FIG. 12C shows a distortion curve of the optical imaging lens assembly according to Embodiment 6 to represent distortion values corresponding to different fields of view. FIG. 12D shows a lateral color curve of the optical imaging lens assembly according to Embodiment 6 to represent deviation of different image heights on the imaging surface after the light passes through the lens. According to FIGS. 12A-12D, it can be seen that the optical imaging lens assembly provided in Embodiment 6 may achieve high imaging quality.

Embodiment 7

Figure 13:
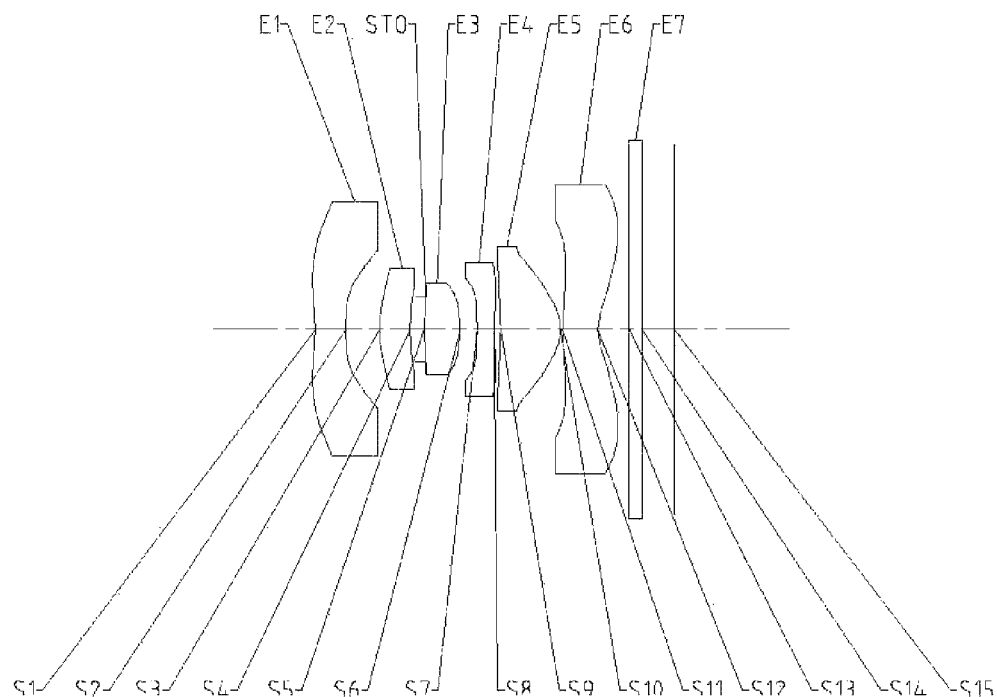
FIG. 13 shows a structural schematic diagram of an optical imaging lens assembly according to Embodiment 7 of the disclosure.

An optical imaging lens assembly according to Embodiment 7 of the disclosure will be described below with reference to FIGS. 13-14D. FIG. 13 shows a structural schematic diagram of an optical imaging lens assembly according to Embodiment 7 of the disclosure.

As shown in FIG. 13, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens assembly is 1.90 mm, a distance TTL from the object-side surface S1 of the first lens E1 to the imaging surface S15 on the optical axis is 5.79 mm, ImgH is a half of a diagonal length of an effective pixel region on the imaging surface S15, and ImgH is 2.93 mm, Semi-FOV is a half of a maximum field of view of the optical imaging lens assembly, and Semi-FOV is 60.0°, and an Fno of the optical imaging lens assembly is 2.23.

Table 19 shows a basic parameter table of the optical imaging lens assembly of Embodiment 7, wherein the units of the curvature radius, the thickness/distance and the focal length are all millimeters (mm).

TABLE 19

| Surface number | Surface type | Curvature radius | Thickness/ distance | Material Refractive Index N | Material Abbe number V | Focal length | Conic coefficient |
|---|---|---|---|---|---|---|---|
| OBJ | Spherical | Infinite | Infinite | | | | |
| S1 | Aspheric | −2.3152 | 0.4889 | 1.55 | 56.1 | −3.22 | 0.0008 |
| S2 | Aspheric | 7.8000 | 0.5473 | | | | 0.1003 |
| S3 | Aspheric | 2.1746 | 0.4906 | 1.62 | 25.9 | 6.39 | −2.6371 |
| S4 | Aspheric | 4.4136 | 0.2455 | | | | −51.1156 |
| STO | Spherical | Infinite | −0.0191 | | | | |
| S5 | Aspheric | 4.1411 | 0.5856 | 1.55 | 56.1 | 2.58 | −18.1035 |
| S6 | Aspheric | −2.0262 | 0.2700 | | | | −0.2091 |
| S7 | Aspheric | 15.0114 | 0.2700 | 1.68 | 19.2 | −4.82 | 90.0000 |
| S8 | Aspheric | 2.6632 | 0.1046 | | | | −0.0809 |
| S9 | Aspheric | −7.4740 | 0.9635 | 1.54 | 55.6 | 1.50 | −1.0000 |
| S10 | Aspheric | −0.7590 | 0.0328 | | | | −1.1168 |
| S11 | Aspheric | 2.2674 | 0.5661 | 1.65 | 23.5 | −1.95 | 0.1616 |
| S12 | Aspheric | 0.7304 | 0.5099 | | | | −0.9890 |
| S13 | Spherical | Infinite | 0.2100 | 1.52 | 64.2 | | |
| S14 | Spherical | Infinite | 0.5203 | | | | |
| S15 | Spherical | Infinite | | | | | |

In Embodiment 7, both the object-side surface and the image-side surface of any lens in the first lens E1 to the sixth lens E6 are aspheric surfaces. Table 20 and Table 21 show higher-order coefficients A4, A6, A8, A10, A12, A14, A16, A18, A20, A22, A24, A26, A28, and A30 that can be used for each of the aspheric mirror surfaces S1-S16 in Embodiment 7.

TABLE 20

| Surface number | A4 | A6 | A8 | A10 | A12 | A14 | A16 |
|---|---|---|---|---|---|---|---|
| S1 | 4.1452E−01 | −5.9030E−01 | 9.3404E−01 | −1.2790E+00 | 1.3564E+00 | −1.0746E+00 | 6.3122E−01 |
| S2 | 4.5301E−01 | 1.7574E−02 | −4.4233E+00 | 2.8332E+01 | −1.0782E+02 | 2.7594E+02 | −4.9492E+02 |
| S3 | 6.0422E−02 | −3.6348E−01 | 1.4733E+00 | −5.5739E+00 | 1.4235E+01 | −2.3255E+01 | 2.3213E+01 |
| S4 | 1.0292E−01 | −1.0450E−01 | 5.2918E−01 | −6.5798E+00 | 4.9875E+01 | −1.9951E+02 | 4.4537E+02 |
| S5 | −5.5547E−03 | 7.9415E−01 | −1.7215E+01 | 2.0305E+02 | −1.4979E+03 | 6.8317E+03 | −1.8714E+04 |
| S6 | −2.1953E−01 | −1.1273E−01 | 2.1583E+00 | −1.8928E+01 | 8.8578E+01 | −2.5732E+02 | 4.4900E+02 |
| S7 | −5.5145E−01 | −1.2571E+00 | 2.1000E+01 | −1.3929E+02 | 5.4379E+02 | −1.3561E+03 | 2.1922E+03 |
| S8 | −4.8066E−01 | −2.6582E−02 | 3.9811E+00 | −1.3513E+01 | 2.0210E+01 | −7.2746E+00 | −2.2305E+01 |
| S9 | 1.0278E−01 | −1.6276E+00 | 8.6270E+00 | −2.9171E+01 | 8.7122E+01 | −2.3270E+02 | 4.8508E+02 |
| S10 | 3.5949E−01 | −1.4309E+00 | 5.1872E+00 | −1.2561E+01 | 2.0067E+01 | −2.0204E+01 | 1.0916E+01 |
| S11 | −3.0132E−01 | −7.2949E−01 | 4.7074E+00 | −1.2050E+01 | 1.9269E+01 | −2.1314E+01 | 1.6939E+01 |
| S12 | −1.2977E+00 | 2.3619E+00 | −3.4080E+00 | 3.7011E+00 | −2.9982E+00 | 1.8095E+00 | −8.1404E−01 |

TABLE 21

| Surface number | A18 | A20 | A22 | A24 | A26 | A28 | A30 |
|---|---|---|---|---|---|---|---|
| S1 | −2.7438E−01 | 8.7818E−02 | −2.0414E−02 | 3.3518E−03 | −3.6847E−04 | 2.4335E−05 | −7.2994E−07 |
| S2 | 6.3257E+02 | −5.7759E+02 | 3.7294E+02 | −1.6586E+02 | 4.8211E+01 | −8.2236E+00 | 6.2264E−01 |
| S3 | −1.2800E+01 | 2.9681E+00 | 0.0000E+00 | 0.0000E+00 | 0.0000E+00 | 0.0000E+00 | 0.0000E+00 |
| S4 | −5.2258E+02 | 2.5063E+02 | 0.0000E+00 | 0.0000E+00 | 0.0000E+00 | 0.0000E+00 | 0.0000E+00 |
| S5 | 2.8114E+04 | −1.7757E+04 | 0.0000E+00 | 0.0000E+00 | 0.0000E+00 | 0.0000E+00 | 0.0000E+00 |
| S6 | −4.3190E+02 | 1.7563E+02 | 0.0000E+00 | 0.0000E+00 | 0.0000E+00 | 0.0000E+00 | 0.0000E+00 |
| S7 | −2.2332E+03 | 1.3046E+03 | −3.3230E+02 | 0.0000E+00 | 0.0000E+00 | 0.0000E+00 | 0.0000E+00 |
| S8 | 3.9073E+01 | −2.8935E+01 | 1.0680E+01 | −1.6058E+00 | 0.0000E+00 | 0.0000E+00 | 0.0000E+00 |
| S9 | −7.2823E+02 | 7.6663E+02 | −5.5784E+02 | 2.7388E+02 | −8.6310E+01 | 1.5693E+01 | −1.2439E+00 |
| S10 | −3.5948E−01 | −3.6805E+00 | 2.4532E+00 | −7.0301E−01 | 7.8734E−02 | 0.0000E+00 | 0.0000E+00 |
| S11 | −9.8131E+00 | 4.1487E+00 | −1.2656E+00 | 2.7114E−01 | −3.8684E−02 | 3.2986E−03 | −1.2711E−04 |
| S12 | 2.7254E−01 | −6.7433E−02 | 1.2137E−02 | −1.5426E−03 | 1.3105E−04 | −6.6721E−06 | 1.5381E−07 |

Figure 14A:
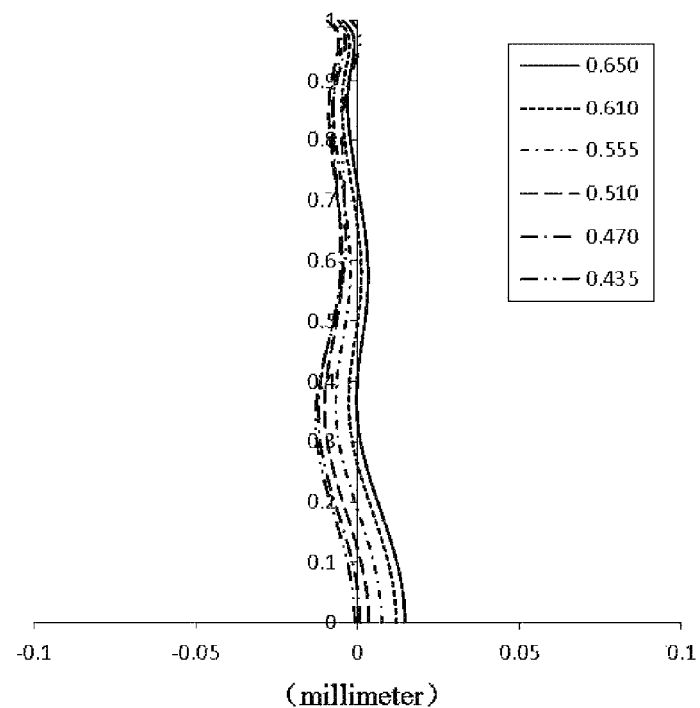
Figure 14B:
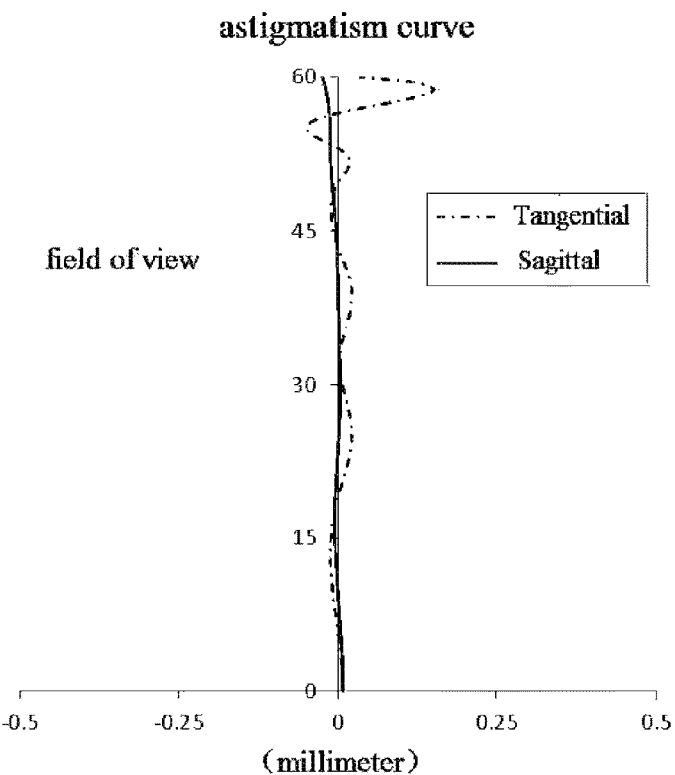
Figure 14C:
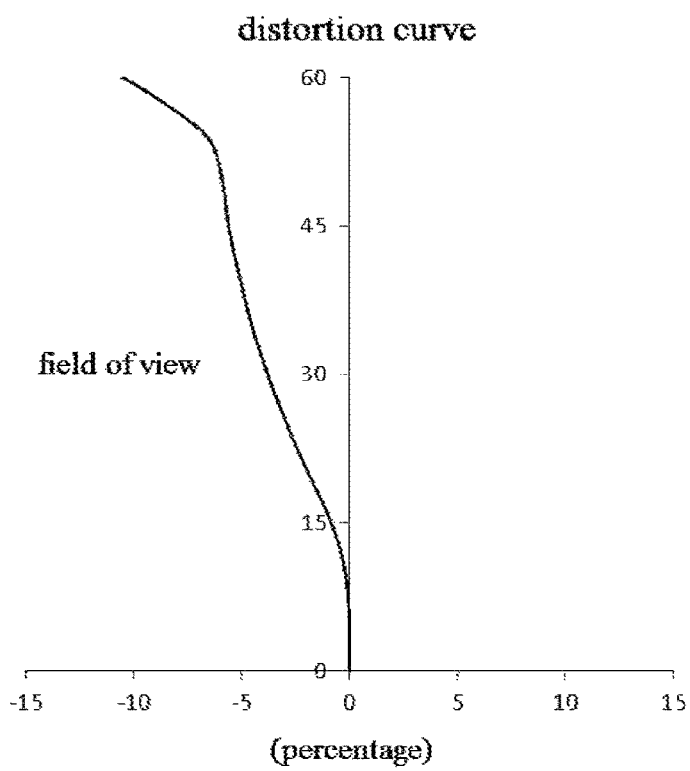

FIG. 14A shows a longitudinal aberration curve of the optical imaging lens assembly according to Embodiment 7 to represent deviation of a convergence focal point after light with different wavelengths passes through the lens. FIG. 14B shows an astigmatism curve of the optical imaging lens assembly according to Embodiment 7 to represent a curvature of tangential image surface and a curvature of sagittal image surface. FIG. 14C shows a distortion curve of the optical imaging lens assembly according to Embodiment 7 to represent distortion values corresponding to different fields of view. FIG. 14D shows a lateral color curve of the optical imaging lens assembly according to Embodiment 7 to represent deviation of different image heights on the imaging surface after the light passes through the lens. According to FIGS. 14A-14D, it can be seen that the optical imaging lens assembly provided in Embodiment 7 may achieve high imaging quality.

From the above, Embodiment 1 to Embodiment 7 satisfy a relationship shown in Table 22 respectively.

TABLE 22

| Conditional expression/Embodiment | 1 | 2 | 3 | 4 | 5 | 6 | 7 |
|---|---|---|---|---|---|---|---|
| (R1 − R2)/(R1 + R2) | −1.84 | −1.87 | −1.49 | −2.08 | −1.55 | −2.44 | −1.84 |
| R4/R3 | 2.30 | 1.81 | 2.17 | 2.36 | 1.90 | 2.23 | 2.03 |
| f2/f1 | −2.03 | −2.38 | −2.38 | −1.99 | −2.22 | −2.03 | −1.99 |
| f4/f3 | −2.02 | −2.22 | −1.92 | −1.98 | −2.03 | −1.76 | −1.87 |
| TTL/f6 | −3.04 | −3.06 | −3.01 | −2.83 | −3.02 | −2.82 | −2.96 |
| R5/R6 | −2.17 | −1.74 | −2.18 | −2.16 | −2.03 | −2.05 | −2.04 |
| T12/CT1 | 1.13 | 1.13 | 1.02 | 1.12 | 1.16 | 1.16 | 1.12 |
| CT3/T34 | 2.41 | 2.48 | 2.43 | 3.28 | 2.43 | 2.93 | 2.17 |
| CT4/T45 | 2.47 | 2.24 | 2.51 | 1.97 | 2.49 | 2.96 | 2.58 |
| V2/R4(mm − 1) | 4.64 | 6.14 | 4.13 | 4.74 | 5.74 | 5.38 | 5.87 |
| N2/CT2(mm − 1) | 3.24 | 3.22 | 3.68 | 3.22 | 5.39 | 3.29 | 3.30 |
| R7/V4(mm) | 0.40 | 0.36 | 0.31 | 0.41 | 0.37 | 0.32 | 0.78 |
| N5/R10(mm − 1) | −2.10 | −2.03 | −2.07 | −2.10 | −2.03 | −1.80 | −2.03 |
| R11/N6(mm) | 1.40 | 1.35 | 1.39 | 1.37 | 1.34 | 1.35 | 1.37 |

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions provided in the disclosure.

What is claimed is:

1. An optical imaging lens assembly with six lenses, sequentially comprising from an object side to an image side along an optical axis:
   a first lens with a negative refractive power, an object-side surface thereof is a concave surface, and an image-side surface thereof is a concave surface;
   a second lens with a positive refractive power, an object-side surface thereof is a convex surface, and an image-side surface thereof is a concave surface;
   a third lens with a positive refractive power;
   a fourth lens with a negative refractive power;
   a fifth lens with a positive refractive power; and
   a sixth lens with a negative refractive power;
   wherein Semi-FOV≥60°;

$-2.5<(R1-R2)/(R1+R2)<-1.0$; and $1.5<R4/R3<2.5$, wherein Semi-FOV is a half of a maximum field of view of the optical imaging lens assembly, R1 is a curvature radius of an object-side surface of the first lens, R2 is a curvature radius of an image-side surface of the first lens, R3 is a curvature radius of an object-side surface of the second lens, and R4 is a curvature radius of an image-side surface of the second lens;
   a distance TTL from the object-side surface of the first lens to an imaging surface on the optical axis and an effective focal length f6 of the sixth lens satisfy:

$-3.5<TTL/f6<-2.5$.

2. The optical imaging lens assembly according to claim 1, wherein an effective focal length f1 of the first lens and an effective focal length f2 of the second lens satisfy:

$-2.5<f2/f1<-1.5$.

3. The optical imaging lens assembly according to claim 1, wherein an effective focal length f3 of the third lens and an effective focal length f4 of the fourth lens satisfy:

$-2.5<f4/f3<-1.5$.

4. The optical imaging lens assembly according to claim 1, wherein a curvature radius R5 of an object-side surface of the third lens and a curvature radius R6 of an image-side surface of the third lens satisfy:

$-2.5<R5/R6<-1.5$.

5. The optical imaging lens assembly according to claim 1, wherein a center thickness CT1 of the first lens on the optical axis and an air space T12 between the first lens and the second lens on the optical axis satisfy:

$1.0<T12/CT1<1.5$.

6. The optical imaging lens assembly according to claim 1, wherein a center thickness CT3 of the third lens on the optical axis and an air space T34 between the third lens and the fourth lens on the optical axis satisfy:

$2.0<CT3/T34<3.5$.

7. The optical imaging lens assembly according to claim 1, wherein a center thickness CT4 of the fourth lens on the optical axis and an air space T45 between the fourth lens and the fifth lens on the optical axis satisfy:

$1.5<CT4/T45<3.0$.

8. The optical imaging lens assembly according to claim 1, wherein an abbe number V2 of the second lens and the curvature radius R4 of the image-side surface of the second lens satisfy:

$4.0 \text{ mm}-1<V2/R4<6.5 \text{ mm}-1$.

9. The optical imaging lens assembly according to claim 1, wherein a refractive index N2 of the second lens and a center thickness CT2 of the second lens on the optical axis satisfy:

$3.0 \text{ mm}-1<N2/CT2<5.5 \text{ mm}-1$.

10. The optical imaging lens assembly according to claim 1, wherein a curvature radius R7 of an object-side surface of the fourth lens and an abbe number V4 of the fourth lens satisfy:

$0<R7/V4<1.0 \text{ mm}$.

11. The optical imaging lens assembly according to claim 1, wherein a curvature radius R10 of an image-side surface of the fifth lens and a refractive index N5 of the fifth lens satisfy:

−2.5 mm−1<$N5/R10$<−1.5 mm−1.

12. The optical imaging lens assembly according to claim 1, wherein a curvature radius R11 of an object-side surface of the sixth lens and a refractive index N6 of the sixth lens satisfy:

1.0 mm<$R11/N6$<1.5 mm.

13. An optical imaging lens assembly with six lenses, sequentially comprising from an object side to an image side along an optical axis:
  a first lens with a negative refractive power, an object-side surface thereof is a concave surface, and an image-side surface thereof is a concave surface;
  a second lens with a positive refractive power;
  a third lens with a positive refractive power;
  a fourth lens with a negative refractive power;
  a fifth lens with a positive refractive power; and
  a sixth lens with a negative refractive power;
  wherein Semi-FOV≥60°;

−2.5<(R1−R2)/(R1+R2)<−1.0; and 2.0<$CT3/T34$<3.5, wherein Semi-FOV is a half of a maximum field of view of the optical imaging lens assembly, R1 is a curvature radius of an object-side surface of the first lens, R2 is a curvature radius of an image-side surface of the first lens, CT3 is a center thickness of the third lens on the optical axis, and T34 is an air space between the third lens and the fourth lens on the optical axis;

a distance TTL from the object-side surface of the first lens to an imaging surface on the optical axis and an effective focal length f6 of the sixth lens satisfy:

−3.5<$TTL/f6$<−2.5.

14. The optical imaging lens assembly according to claim 13, wherein an effective focal length f1 of the first lens and an effective focal length f2 of the second lens satisfy:

−2.5<$f2/f1$<−1.5.

15. The optical imaging lens assembly according to claim 13, wherein an effective focal length f3 of the third lens and an effective focal length f4 of the fourth lens satisfy:

−2.5<$f4/f3$<−1.5.

16. The optical imaging lens assembly according to claim 13, wherein a curvature radius R5 of an object-side surface of the third lens and a curvature radius R6 of an image-side surface of the third lens satisfy:

−2.5<$R5/R6$<−1.5.

17. The optical imaging lens assembly according to claim 13, wherein a center thickness CT1 of the first lens on the optical axis and an air space T12 between the first lens and the second lens on the optical axis satisfy:

1.0<$T12/CT1$<1.5.

18. The optical imaging lens assembly according to claim 17, wherein a curvature radius R3 of an object-side surface of the second lens and a curvature radius R4 of an image-side surface of the second lens satisfy:

1.5<$R4/R3$<2.5.

* * * * *